(12) United States Patent
Xue et al.

(10) Patent No.: US 9,240,690 B2
(45) Date of Patent: Jan. 19, 2016

(54) POWER TRANSFER DEVICE

(75) Inventors: Rui-Feng Xue, Singapore (SG); Jia Hao Cheong, Singapore (SG); Hyouk-Kyu Cha, Singapore (SG); Minkyu Je, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 721 days.

(21) Appl. No.: 13/608,426

(22) Filed: Sep. 10, 2012

(65) Prior Publication Data

US 2013/0062962 A1 Mar. 14, 2013

(30) Foreign Application Priority Data

Sep. 8, 2011 (SG) .............................. 201106464-9

(51) Int. Cl.

| H01F 37/00 | (2006.01) |
|---|---|
| H01F 38/00 | (2006.01) |
| H02J 5/00 | (2006.01) |
| H01F 38/14 | (2006.01) |
| G05F 1/10 | (2006.01) |
| H02M 7/217 | (2006.01) |

(52) U.S. Cl.
CPC . *H02J 5/005* (2013.01); *G05F 1/10* (2013.01); *H01F 38/14* (2013.01); *H02M 7/217* (2013.01)

(58) Field of Classification Search
CPC ............ H02J 5/005; H01F 38/14; G05F 1/10; H02M 7/217
USPC ........................................................ 307/104
See application file for complete search history.

(56) References Cited

U.S. PATENT DOCUMENTS

| 6,703,815 B2 | 3/2004 | Biagi |
| 7,825,543 B2 | 11/2010 | Karalis et al. |
| 2007/0109026 A1 | 5/2007 | Ho |
| 2010/0141042 A1 | 6/2010 | Kesler et al. |

OTHER PUBLICATIONS

Guo, et al., A 6-μW Chip-Area-Efficient Output-Capacitorless LDO in 90nm CMOS Technology, 45 IEEE Journal of Solid-State Circuits, 1896 (2010).
Brianti, et al., High-Speed Autozeroed CMOS Comparator for Multistep A/D Conversion, 29 Microelectronics Journal, 845 (1998).
Or, et al., An Output-Capacitorless Low-Dropout Regulator with Direct Voltage-Spike Detection, 45 IEEE Journal of Solid-State Circuits 458 (2010).
http://en.wikipedia.org/wiki/Impedance_matching.

(Continued)

*Primary Examiner* — Hal Kaplan
(74) *Attorney, Agent, or Firm* — K. David Crockett, Esq.; Niky Economy Syrengelas, Esq.; Crockett & Crockett, PC

(57) ABSTRACT

A power transfer device is provided. The power transfer device includes a circuit arrangement including a primary side having a primary coil; a secondary side having a secondary coil inductively coupled to the primary coil and a load transformation unit; wherein the load transformation unit includes an inductor and a capacitor; wherein the secondary coil, the inductor and the capacitor respectively includes a first terminal and a second terminal; wherein the first terminal of the secondary coil is coupled to the first terminal of the capacitor, the second terminal of the capacitor is coupled to the first terminal of the inductor, and the second terminal of the inductor is coupled to the second terminal of the secondary coil.

21 Claims, 28 Drawing Sheets

(56) References Cited

OTHER PUBLICATIONS

Sodagar, et al., A Wireless Implantable Microsystem for Multichannel Neural Recording, 57 IEEE Trans. Microwave Theory Tech., 2565 (2009).
Jow, et al., Design and Optimization of Printed Spiral Coils for Efficient Transcutaneous Inductive Power Transmission, 1 IEEE Trans. Biomed. Circuits Syst., 193 (2007).
Ko, et al., Design of Radio-Frequency Powered Coils for Implant Instruments, 15 Med. Bio. Eng. Comput., 634 (1977).
Kurs, et al., Wireless Power Transfer Via Strongly Coupled Magnetic Resonances, 317 Science Express, 83 (2007).
RamRakhyani, et al. Design and Optimization of Resonance-Based Efficient Wireless Power Delivery Systems for Biomedical Implants, 5 IEEE Trans. Biomed. Circuits Syst., 48 (2011).
Guo, et al., An Efficiency-Enhanced CMOS Rectifier with Unbalanced-Biased Comparators for Transcutaneous-Powered High-Current Implants, 44 IEEE J. of Solid-State Circuits, 1796 (2009).
Bawa, et al., Active High Power Conversion Efficiency Rectifier with Built-in Dual-Mode Back Telemetry in Standard CMOS Technology, 2 IEEE Trans. Biomedical Circuits and Systems, 184 (2008).
Lam, et al., Integrated Low-Loss CMOS Active Rectifier for Wirelessly Powered Devices, 53 IEEE Trans. Circuits and Systems II, 1378 (2006).
Lee, et al., An Integrated Power-Efficient Active Rectifier with Offset-Controlled High Speed Comparators for Inductively Powered Applications, 58 IEEE Trans. Circuits and Systems I, 1749 (2011).
Leung, et al., A CMOS Low-Dropout Regulator with a Momentarily Current-Boosting Voltage Buffer, 57 IEEE Transactions on Circuits and Systems-I, 2312 (2010).
Hwang, et al., A 0.35μm CMOS Sub-1V Low-Quiescent-Current Low-Dropout Regulator, IEEE Asian Solid-State Circuits Conference, 153 (2008).
Chen, et al., Sub-1V Capacitor-Free Low-Power-Consumption LDO with Digital Controlled Loop, in Asia Pacific Conference on Circuits and Systems, 526 (2008).
Man, et al., A High Slew-Rate Push-Pull Output Amplifier for Low-Quiescent Current Low-Dropout Regulators with Transient-Response Improvement, 54 IEEE Transactions on Circuits and Systems-II: Express Briefs, 755 (2007).
Kiani, An RFID-Based Closed-Loop Wireless Power Transmission System for Biomedical Applications, 57 IEEE Transactions on Circuits and Systems-II: Express Briefs, 260 (2010).
Bawa, et al., An Efficient 13.56 MHz Active Back-Telemetry Rectifier in Standard CMOS Technology, in IEEE Proc. ISCAS, 1201 (2010).
Kotani, et al., High-Efficiency Differential-Drive CMOS Rectifier for UHF RFIDs, 44 IEEE J. of Solid-State Circuits, 3011 (2009).
Mandal, et al., Low-Power CMOS Rectifier Design for RFID Applications, 54 IEEE Trans. Circuits and Systems I, 1177 (2007).
Kim, et al., Semi-Active High-Efficient CMOS Rectifier for Wireless Power Transmission, IEEE Radio Frequency Integrated Circuits Symposium, 97 (2010).
Sodagar, et al., An Implantable 64-Channel Wireless Microsystem for Single-Unit Neural Recording, 44 IEEE Journal of Solid-State Circuits, 2591 (2009).

| Measurement @ 13.56MHz with 50Ω load | | Voltage Transfer Gain S21 (dB) | Power Transfer Efficiency |
|---|---|---|---|
| 10mm spacing | Air | -1.252dB | 75.0% |
| | Tissue | -2.348dB | 58.2% |
| 20mm spacing | Air | -6.885dB | 20.5% |
| | Tissue | -7.370dB | 18.3% |
| 50mm spacing | Air | -23.578dB | 0.44% |
| | Tissue | -27.921dB | 0.16% |

Figure 5

POWER TRANSFER DEVICE

This application claims priority to Singapore Patent Application No. 201106464-9, filed Sep. 8, 2011.

FIELD OF THE INVENTIONS

Various embodiments relate generally to a power transfer device. Various embodiments relate generally to a circuit arrangement, a rectifier and a regulator of a power transfer device.

BACKGROUND OF THE INVENTIONS

In recent years, much research in the field of implantable biomedical devices is being carried out for wide range of applications such as neural recording, cochlear implant, retinal prosthesis, and etc.

One of the issues in the development of implantable biomedical devices is the consistent provision of a stable, reliable power supply. The usage of batteries is avoided since it requires periodic replacement due to its limited lifetime and can cause much discomfort and health risk to the patient with the implant device. Therefore, wireless power transfer to implantable biomedical devices are used as it obviates the need for implanted batteries or pierced wirings and can provide a safer and more robust implementation.

FIG. 23 shows a conventional wireless power transfer system 2300 for biomedical implants. The conventional wireless powering link 2300 has an inductive coupling 2302, a rectifier 2304 and a regulator 2306. Inductive coupling is generally used for transcutaneous power transfer from the outside body into the implanted device wirelessly. The inductive coupling 2302 includes a primary coil 2308 of an external transmitting device 2312 on an external side 2310 of the conventional wireless power transfer system 2300 and a secondary coil 2314 of an implant device 2318 on an implanted side 2316 of the conventional wireless power transfer system 2300. The primary coil 2308 and the secondary coil 2314 are coupled at a distance with living tissue in between.

It is desirable to maximize the efficiency of the wireless power transfer system 2300 so that less transmitting power may be required and/or a longer distance between the external transmitting device 2312 and the implant device 2318 can be facilitated while using the same transmitting power from the external device 2312. An operating frequency for power transfer is preferable to have a relatively high value, considering the size of the secondary coil inductor 2314 in the implant device 2318. However, the operating frequency cannot be too high due to the increased tissue absorption. High efficiency is also desirable for living tissue safety by reducing the RF exposure to avoid cellular damage. However, the overall efficiency of the conventional wireless power transfer system 2300 is generally far less than 10%. The inductive coupling 2302 generally has quite a low efficiency on account of unfavorable coupling conditions such as size constraint, power requirement and biocompatibility.

The rectifier 2304 of the conventional wireless power transfer system 2300 is utilized to convert a transmitted AC signal to an unregulated DC signal. The unregulated DC signal can be applied to the regulator 2306 to obtain a stable DC voltage which is supplied to the building blocks in the implant device 2318.

Different types of rectifiers can be used for the rectifier 2304. CMOS rectifiers have the advantage of its low-cost process and its compatibility with other building blocks. However, CMOS rectifiers may have a problem of efficiency degradation due to the forward voltage drop and reverse-leakage current. In comparison with CMOS rectifiers, the Schottky diode rectifier may require additional process steps that lead to an increase in the implementation cost.

Moreover, the efficiency problem of conventional wireless powering links becomes more significant considering large power dynamic range. The required regulated DC output power is application-specific, which can vary from microwatt to watt level in biomedical applications. In high power case, big transistors required in the rectifier 2304 to reduce its forward voltage drop may impose the heavy loading effect on the conventional efficiency-boosting structure of the inductive coupling 2302, which adds a capacitor to form the high-Q resonance. In low power case, the reverse leakage current of the rectifier 2304 may degrades its efficiency, and the regulator 2306 may require more power consumption or off-chip capacitors to keep its stability, which is not desirable for size and cost considerations.

SUMMARY

According to one embodiment, a power transfer device is provided. The power transfer device includes a circuit arrangement including a primary side having a primary coil; a secondary side having a secondary coil inductively coupled to the primary coil and a load transformation unit; wherein the load transformation unit includes an inductor and a capacitor; wherein the secondary coil, the inductor and the capacitor respectively includes a first terminal and a second terminal; wherein the first terminal of the secondary coil is coupled to the first terminal of the capacitor, the second terminal of the capacitor is coupled to the first terminal of the inductor, and the second terminal of the inductor is coupled to the second terminal of the secondary coil.

An optimal resonant load of the load transformation unit may be represented by $$\frac{\omega L_2 \sqrt{1+k^2 Q_1 Q_2}}{Q_2} - j\omega L_2,$$

whereby $\omega$ is a power carrier frequency, k is a coupling coefficient between the primary coil and the secondary coil, $L_2$ is an inductance of the secondary coil, $Q_1$ is a quality factor of the primary coil and $Q_2$ is a quality factor of the secondary coil.

The power transfer device may further include a rectifier including a first transistor, a second transistor, a third transistor and a fourth transistor respectively having a first terminal, a second terminal and a control terminal; a first comparator and a second comparator respectively having a first input terminal, a second input terminal, a third input terminal, a fourth input terminal, a first output terminal and a second output terminal; wherein the first input terminal of the first comparator is coupled to the first input terminal of the second comparator, the second input terminal of the first comparator is coupled to the third input terminal of the second comparator, the third input terminal of the first comparator is coupled to the second input terminal of the second comparator, and the fourth input terminal of the first comparator is coupled to the fourth input terminal of the second comparator; wherein the first terminal of the first transistor is coupled to the first terminal of the second transistor, the second terminal of the first transistor is coupled to the second terminal of the third transistor, the second terminal of the second transistor is coupled to the second terminal of the fourth transistor, and the first terminal of the third transistor is coupled to the first terminal of the fourth transistor; wherein the first comparator is configured to compare a first voltage applied to the first input terminal of the first comparator and a second voltage applied to the second input terminal of the first comparator during a first operation cycle, and the second comparator is configured to compare a first voltage applied to the first input terminal of the second comparator and a second voltage applied to the second input terminal of the second comparator during a second operation cycle; wherein when the second voltage is greater than the first voltage during the first operation cycle, the first comparator is configured to output a first voltage signal at the first output terminal of the first comparator and a second voltage signal at the second output terminal of the first comparator; wherein when the second voltage is smaller than the first voltage during the first operation cycle, the first comparator is configured to output the second voltage signal at the first output terminal of the first comparator and the first voltage signal at the second output terminal of the first comparator; wherein when the second voltage is greater than the first voltage during the second operation cycle, the second comparator is configured to output a first voltage signal at the first output terminal of the second comparator and a second voltage signal at the second output terminal of the second comparator; wherein when the second voltage is smaller than the first voltage during the second operation cycle, the second comparator is configured to output the second voltage signal at the first output terminal of the second comparator and the first voltage signal at the second output terminal of the second comparator.

The first transistor, the second transistor, the third transistor and the fourth transistor of the rectifier may respectively include a third terminal. The rectifier may further include a first dynamic body bias unit having a first terminal, a second terminal and a third terminal, and a second dynamic body bias unit having a first terminal, a second terminal and a third terminal. The first terminal of the first dynamic body bias unit may be coupled to the first terminal of the first transistor, the first terminal of the second transistor, the second input terminal of the first comparator and the third input terminal of the second comparator. The second terminal of the first dynamic body bias unit may be coupled to the second terminal of the first transistor, the first input terminal of the first comparator, the first input terminal of the second comparator, the second terminal of the third transistor and the second terminal of the second dynamic body bias unit. The third terminal of the first dynamic body bias unit may be coupled to the third terminal of the first transistor. The first terminal of the second dynamic body bias unit may be coupled to the first terminal of the third transistor, the first terminal of the fourth transistor, the third input terminal of the first comparator and the second input terminal of the second comparator. The third terminal of the second dynamic body bias unit may be coupled to the third terminal of the third transistor. The third terminal of the second transistor may be coupled to the second terminal of the second transistor and the third terminal of the fourth transistor is coupled to the second terminal of the fourth transistor.

The rectifier may further include a first input terminal and a second input terminal. The first input terminal may be coupled to the first terminal of the first dynamic body bias unit and the second input terminal may be coupled to the first terminal of the second dynamic body bias unit.

The rectifier may further include a capacitor having a first terminal and a second terminal, and a first output terminal and a second output terminal. The first terminal of the capacitor may be coupled to the first output terminal and the second terminal of the second dynamic body bias unit. The second terminal of the capacitor may be coupled to the second output terminal, the second terminal of the second transistor, the fourth input terminal of the first comparator, the fourth input terminal of the second comparator and the second terminal of the fourth transistor.

The second terminal of the capacitor, the second output terminal, the second terminal of the second transistor, the fourth input terminal of the first comparator, the fourth input terminal of the second comparator and the second terminal of the fourth transistor may be coupled to a reference voltage.

The power transfer device may further include a regulator including a first transistor and a second transistor respectively having a first terminal, a second terminal and a control terminal, wherein the second terminal of the first transistor is coupled to the first terminal of the second transistor, a first terminal of the first transistor is coupled to a first voltage reference and a control terminal of the second transistor is coupled to a second voltage reference; a feedback arrangement coupled between the control terminal of the first transistor and the second terminal of the second terminal; wherein the feedback arrangement includes a current comparator having an input terminal and an output terminal; a third transistor and a fourth transistor respectively having a first terminal, a second terminal and a control terminal; wherein the input terminal of the current comparator is coupled to the second terminal of the second terminal, and the output terminal of the current comparator is coupled to the control terminal of the third transistor and the control terminal of the fourth transistor; wherein the first terminal of the third transistor is coupled to the first voltage reference and the second terminal of the third transistor is coupled to the second terminal of the fourth transistor and the control terminal of the first transistor; wherein the first terminal of the fourth transistor is coupled to a third voltage reference.

The regulator may further include a fifth transistor having a first terminal, a second terminal and a control terminal; wherein the first terminal of the fifth transistor is coupled to the third voltage reference, the second terminal of the fifth transistor is coupled to the second terminal of the second transistor, and the control terminal of the fifth transistor is coupled to a third voltage reference.

The regulator may further include an input terminal coupled to the first terminal of the first transistor and the first terminal of the third transistor; and an output terminal coupled between the second terminal of the first transistor and the first terminal of the second transistor.

The rectifier may be coupled between the circuit arrangement and the regulator.

The first input terminal of the rectifier may be coupled to the first terminal of the inductor of the load transformation unit of the circuit arrangement, and the second input terminal of the rectifier may be coupled to the second terminal of the inductor of the load transformation unit of the circuit arrangement. The first output terminal of the rectifier may be coupled to the input terminal of the regulator.

According to another embodiment, a rectifier is provided. The rectifier includes a first transistor, a second transistor, a third transistor and a fourth transistor respectively having a first terminal, a second terminal and a control terminal; a first comparator and a second comparator respectively having a first input terminal, a second input terminal, a third input terminal, a fourth input terminal, a first output terminal and a second output terminal; wherein the first input terminal of the first comparator is coupled to the first input terminal of the second comparator, the second input terminal of the first comparator is coupled to the third input terminal of the second comparator, the third input terminal of the first comparator is coupled to the second input terminal of the second comparator, and the fourth input terminal of the first comparator is coupled to the fourth input terminal of the second comparator; wherein the first terminal of the first transistor is coupled to the first terminal of the second transistor, the second terminal of the first transistor is coupled to the second terminal of the third transistor, the second terminal of the second transistor is coupled to the second terminal of the fourth transistor, and the first terminal of the third transistor is coupled to the first terminal of the fourth transistor; wherein the first comparator is configured to compare a first voltage applied to the first input terminal of the first comparator and a second voltage applied to the second input terminal of the first comparator during a first operation cycle, and the second comparator is configured to compare a first voltage applied to the first input terminal of the second comparator and a second voltage applied to the second input terminal of the second comparator during a second operation cycle; wherein when the second voltage is greater than the first voltage during the first operation cycle, the first comparator is configured to output a first voltage signal at the first output terminal of the first comparator and a second voltage signal at the second output terminal of the first comparator; wherein when the second voltage is smaller than the first voltage during the first operation cycle, the first comparator is configured to output the second voltage signal at the first output terminal of the first comparator and the first voltage signal at the second output terminal of the first comparator; wherein when the second voltage is greater than the first voltage during the second operation cycle, the second comparator is configured to output a first voltage signal at the first output terminal of the second comparator and a second voltage signal at the second output terminal of the second comparator; wherein when the second voltage is smaller than the first voltage during the second operation cycle, the second comparator is configured to output the second voltage signal at the first output terminal of the second comparator and the first voltage signal at the second output terminal of the second comparator.

The first transistor, the second transistor, the third transistor and the fourth transistor of the rectifier may respectively include a third terminal. The rectifier may further include a first dynamic body bias unit having a first terminal, a second terminal and a third terminal, and a second dynamic body bias unit having a first terminal, a second terminal and a third terminal. The first terminal of the first dynamic body bias unit may be coupled to the first terminal of the first transistor, the first terminal of the second transistor, the second input terminal of the first comparator and the third input terminal of the second comparator. The second terminal of the first dynamic body bias unit may be coupled to the second terminal of the first transistor, the first input terminal of the first comparator, the first input terminal of the second comparator, the second terminal of the third transistor and the second terminal of the second dynamic body bias unit. The third terminal of the first dynamic body bias unit may be coupled to the third terminal of the first transistor. The first terminal of the second dynamic body bias unit may be coupled to the first terminal of the third transistor, the first terminal of the fourth transistor, the third input terminal of the first comparator and the second input terminal of the second comparator. The third terminal of the second dynamic body bias unit may be coupled to the third terminal of the third transistor. The third terminal of the second transistor may be coupled to the second terminal of the second transistor and the third terminal of the fourth transistor is coupled to the second terminal of the fourth transistor.

The rectifier may further include a first input terminal and a second input terminal. The first input terminal may be coupled to the first terminal of the first dynamic body bias unit and the second input terminal may be coupled to the first terminal of the second dynamic body bias unit.

The rectifier may further include a capacitor having a first terminal and a second terminal, and a first output terminal and a second output terminal. The first terminal of the capacitor may be coupled to the first output terminal and the second terminal of the second dynamic body bias unit. The second terminal of the capacitor may be coupled to the second output terminal, the second terminal of the second transistor, the fourth input terminal of the first comparator, the fourth input terminal of the second comparator and the second terminal of the fourth transistor.

The second terminal of the capacitor, the second output terminal, the second terminal of the second transistor, the fourth input terminal of the first comparator, the fourth input terminal of the second comparator and the second terminal of the fourth transistor may be coupled to a reference voltage.

According to yet another embodiment, a regulator is provided. The regulator includes a first transistor and a second transistor respectively having a first terminal, a second terminal and a control terminal, wherein the second terminal of the first transistor is coupled to the first terminal of the second transistor, a first terminal of the first transistor is coupled to a first voltage reference and a control terminal of the second transistor is coupled to a second voltage reference; a feedback arrangement coupled between the control terminal of the first transistor and the second terminal of the second terminal; wherein the feedback arrangement includes a current comparator having an input terminal and an output terminal; a third transistor and a fourth transistor respectively having a first terminal, a second terminal and a control terminal; wherein the input terminal of the current comparator is coupled to the second terminal of the second terminal, and the output terminal of the current comparator is coupled to the control terminal of the third transistor and the control terminal of the fourth transistor; wherein the first terminal of the third transistor is coupled to the first voltage reference and the second terminal of the third transistor is coupled to the second terminal of the fourth transistor and the control terminal of the first transistor; wherein the first terminal of the fourth transistor is coupled to a third voltage reference.

The regulator may further include a fifth transistor having a first terminal, a second terminal and a control terminal; wherein the first terminal of the fifth transistor is coupled to the third voltage reference, the second terminal of the fifth transistor is coupled to the second terminal of the second transistor, and the control terminal of the fifth transistor is coupled to a third voltage reference.

The regulator may further include an input terminal coupled to the first terminal of the first transistor and the first terminal of the third transistor; and an output terminal coupled between the second terminal of the first transistor and the first terminal of the second transistor.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 5 shows a table of experimental results in both the air environment and the tissue environment and with different coupling distance for a circuit arrangement according to one embodiment.

DETAILED DESCRIPTION OF THE INVENTIONS

Embodiments of a power transfer device will be described in detail below with reference to the accompanying figures. It will be appreciated that the embodiments described below can be modified in various aspects without changing the essence of the invention.

Figure 24:
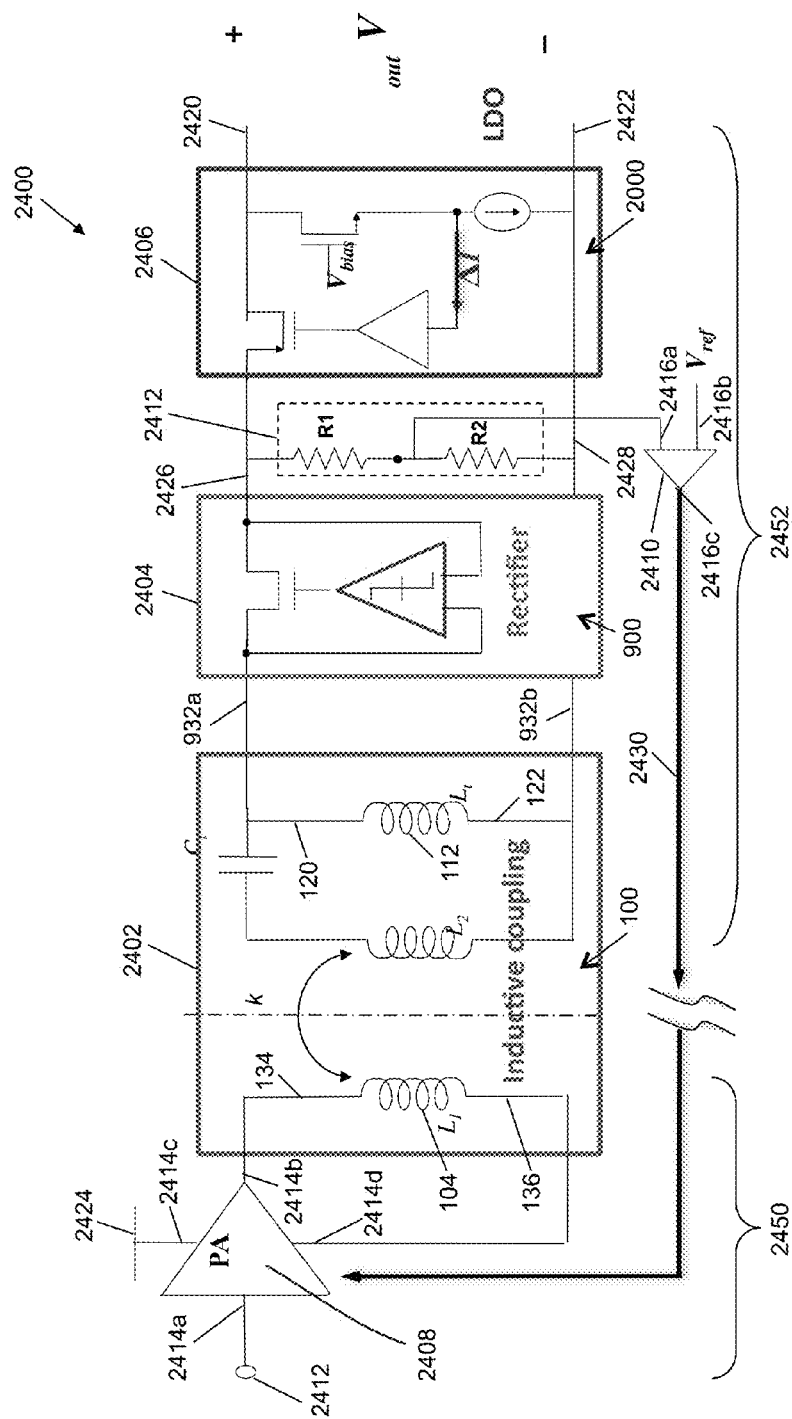
FIG. 24 shows a schematic diagram of a power transfer device according to one embodiment.

FIG. 24 shows a schematic diagram of a power transfer device 2400 according to one embodiment. In one embodiment, the power transfer device 2400 may be a wireless power link device. The power transfer device 2400 includes a circuit arrangement 2402, a rectifier 2404 and a regulator 2406. The rectifier 2404 is coupled between the circuit arrangement 2402 and the regulator 2406.

Details of exemplary embodiments of the circuit arrangement 2402, the rectifier 2404 and the regulator 2406 are described in the following.

Inductive Coupling

Figure 1:
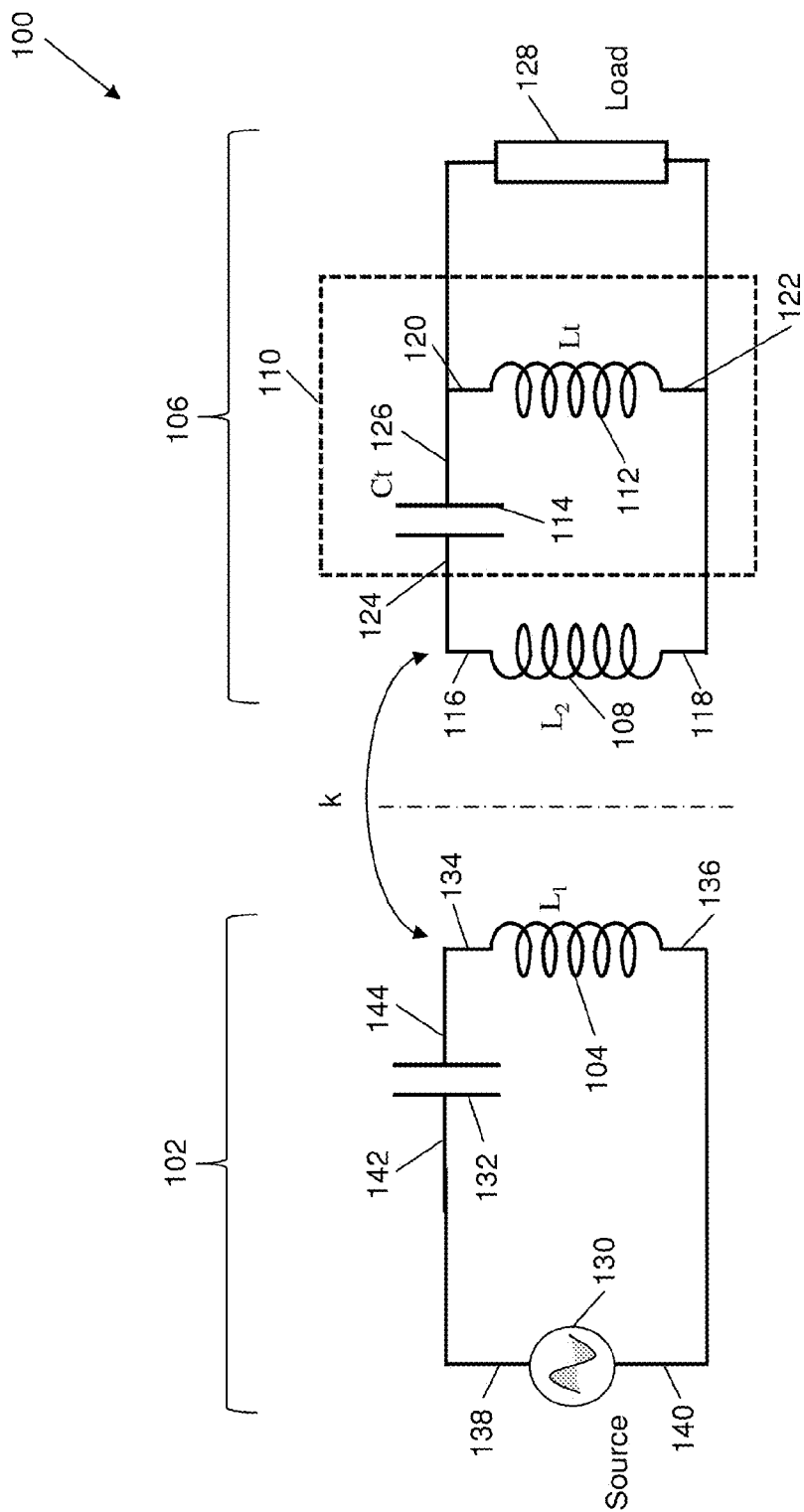
FIG. 1 shows a schematic diagram of a circuit arrangement according to one embodiment.

FIG. 1 shows a schematic diagram of a circuit arrangement 100 according to one embodiment. The circuit arrangement 100 includes a primary side 102 having a primary coil 104. The circuit arrangement 100 also includes a secondary side 106 having a secondary coil 108 inductively coupled to the primary coil 104. The secondary side 106 of the circuit arrangement 100 also has a load transformation unit 110. The load transformation unit 110 includes an inductor 112 and a capacitor 114.

The secondary coil 108 has a first terminal 116 and a second terminal 118. The inductor 112 has a first terminal 120 and a second terminal 122. The capacitor 114 has a first terminal 124 and a second terminal 126. The first terminal 116 of the secondary coil 108 is coupled to the first terminal 124 of the capacitor 114. The second terminal 126 of the capacitor 114 is coupled to the first terminal 120 of the inductor 112. The second terminal 122 of the inductor 112 is coupled to the second terminal 118 of the secondary coil 108. The secondary side 106 may further include a load 128 coupled between the first terminal 120 of the inductor 112 and the second terminal 122 of the inductor 112.

The primary side 102 may further include a voltage source 130 and a capacitor 132. The primary coil 104 has a first terminal 134 and a second terminal 136. The voltage source 130 has a first terminal 138 and a second terminal 140. The capacitor 132 has a first terminal 142 and a second terminal 144. The first terminal 138 of the voltage source 130 is coupled to the first terminal 142 of the capacitor 132 and the second terminal 140 of the voltage source 130 is coupled to the second terminal 136 of the primary coil 104. The second terminal 144 of the capacitor 132 is coupled to the first terminal 134 of the primary coil 104.

Figure 2A:
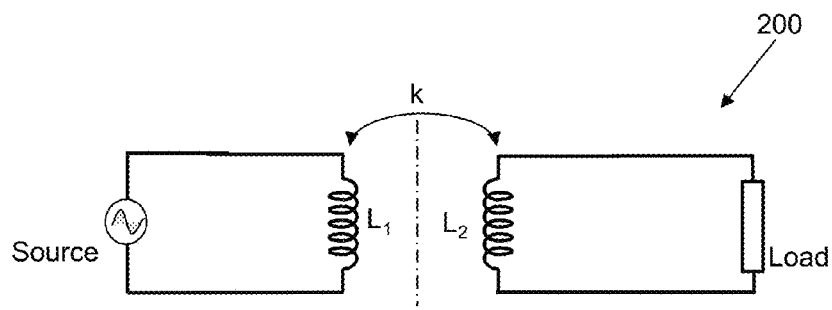
FIGS. 2a to 2c show conventional inductive coupling arrangements.
Figure 2B:
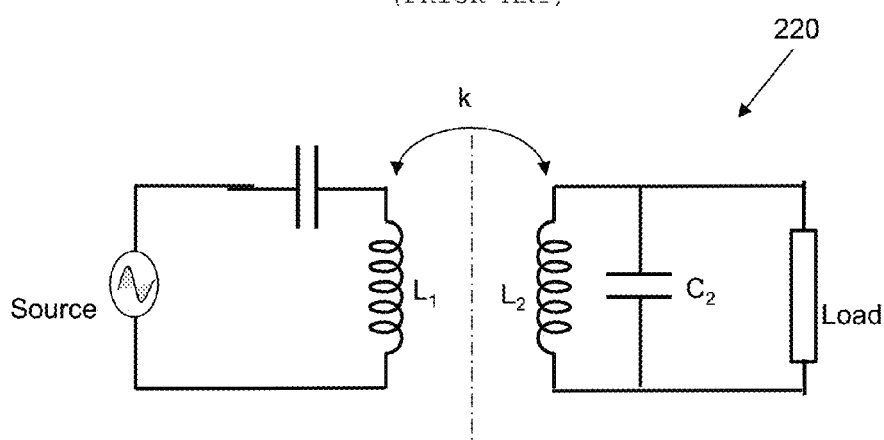

FIG. 2a shows schematic diagram of a conventional plain inductive coupling arrangement 200. The arrangement 200 has low power efficiency due to weak coupling between the inductor $L_1$ and the inductor $L_2$. FIG. 2b shows a conventional resonant coupling arrangement 220. As compared to the plain inductive coupling arrangement 200, the conventional resonant coupling arrangement 220 uses a conventional efficiency-boosting technique for inductive coupling by add a capacitor $C_2$ to form the resonance at a power carrier frequency $\omega$. However, the improvement in efficiency is heavily limited by the loading effect due to the quality factor Q degradation especially with the small load. Bigger load is usually assumed to have higher efficiency.

As compared to the conventional resonant coupling arrangement 220, the circuit arrangement 100 can overcome the loading effect and can make a power transfer efficiency to approach a theoretical limit by an optimal resonant load transformation. An optimal resonant load $Z_L^{Optimum}$ can be represented by:

$$Z_L^{Optimum} = \frac{\omega L_2 \sqrt{1+k^2 Q_1 Q_2}}{Q_2} - j\omega L_2 \quad (1)$$

whereby ω is a power carrier frequency, k is a coupling coefficient between the primary coil and the secondary coil, $L_2$ is an inductance of the secondary coil, $Q_1$ is a quality factor (unloaded) of the primary coil and $Q_2$ is a quality factor (unloaded) of the secondary coil.

The optimal resonant load transformation can be achieved using the load transformation unit 110.

From equation (1), it can be observed that the conventional technique, by adding $C_2$, just partly approaches the optimum load by composing the imaginary part of equation (1). By comparison, the inductor $L_t$ 112 combined with the capacitor $C_t$ 114 in the circuit arrangement 100 not only resonates with the secondary coil $L_2$ 108, but also transforms the load impedance to the optimum value as shown in Equation (1), and hence the maximum power efficiency can be achieved.

The power transfer efficiency η is defined as the power received at the load 128 divided by the input power drawn by the primary coil 104. The maximum power transfer efficiency can be derived as $$\eta_{max\ in\ theory} = \frac{k^2 Q_1 Q_2}{\left(1+\sqrt{1+k^2 Q_1 Q_2}\right)^2} \quad (2)$$

when the load is equal to the optimum value $Z_L^{Optimum}$.

Figure 3:
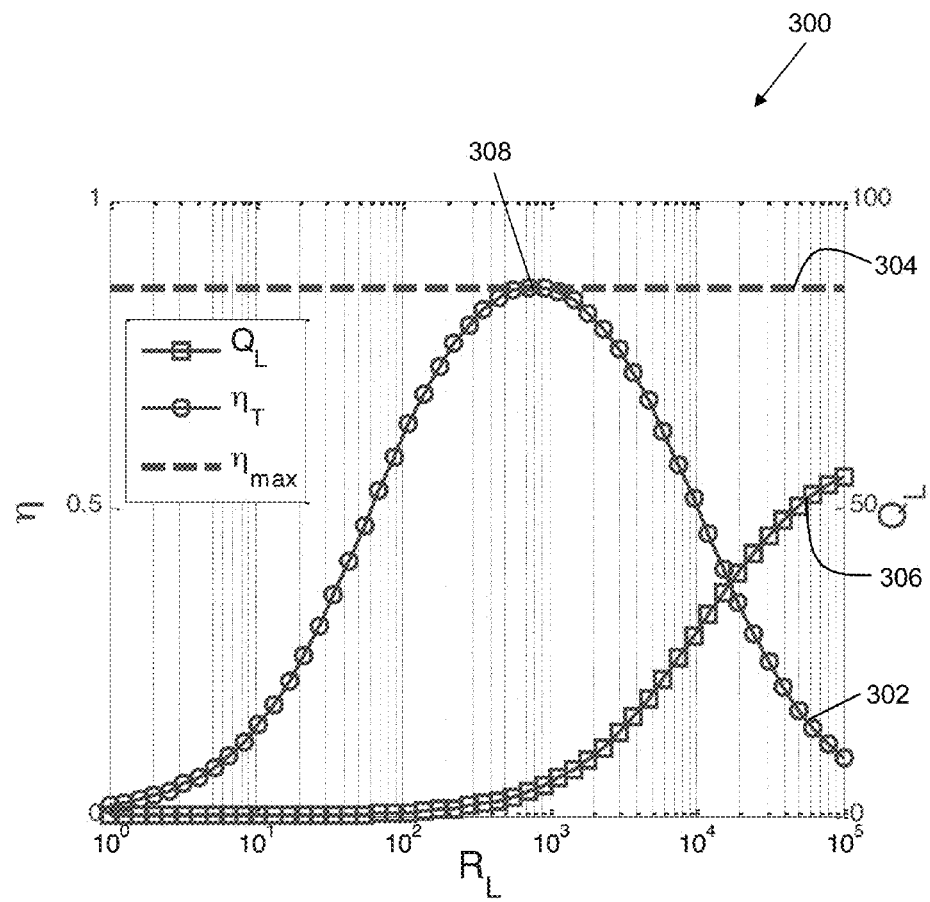
FIG. 3 shows a graph of power transfer efficiency and a loaded quality factor plotted against load for a conventional circuit arrangement, as well as the maximum theoretically achievable power transfer efficiency.

FIG. 3 shows a graph 300 of power transfer efficiency and a loaded quality factor $Q_L$ plotted against load $R_L$. In one embodiment, the resonant frequency $f_r$ may be about 13.56 MHz, the coupling coefficient k may be about 0.2, the inductance $L_1$ of the primary coil 104 may be about 10 μH, the quality factor $Q_1$ of the primary coil 104 may be about 71.0, the inductance $L_2$ of the secondary coil 108 may be about 2 μH, the quality factor $Q_2$ of the secondary coil 108 may be about 60.8, and the load 128 may have a resistance $R_L$ which varies from 1Ω to 100 kΩ.

Graph 300 shows a plot 302 of the power transfer efficiency $\eta_T$ of the conventional circuit arrangement 220. Graph 300 shows a plot 304 of the theoretical limit $\eta_{max}$ of power transfer efficiency. Graph 300 also shows a plot 306 of a loaded quality factor $Q_L$ of the conventional circuit arrangement 220.

It can be observed from plot 302 and plot 304 that the power transfer efficiency $\eta_T$ of the conventional circuit arrangement 220 can approach the theoretical limit of equation (2) only when the condition in equation (1) is met. The condition in equation (1) is met at the point 308 where plot 302 touches plot 304. The point 308 corresponds to the maximum point of plot 302. The efficiency $\eta_T$ is robust for load or coupling variation at the point 308 since the gradient of plot 302 at the maximum point 308 is zero. Furthermore, the efficiency $\eta_T$ does not increase indefinitely with the increase of the load $R_L$. It can be observed from plot 302 that the efficiency $\eta_T$ decreases after the maximum point 308. In the conventional structure, the secondary parallel tank is equivalent to a current source with high impedance. A smaller $R_L$ is better for energy exaction from the current source, but it degrades the Q of resonance precipitously and deteriorates the efficiency. On the other hand, a larger $R_L$ can keep the high-Q resonance while it cannot exact energy from the tank effectively. This is the reason why the curve of plot 302 has low values in both low-$R_L$ and high-$R_L$ regions. The proposed optimal resonant loading transformation technique, e.g. the circuit arrangement 100, can solve this dilemma properly by mitigating the loading effect to assure the efficient resonance and facilitating the effective power extraction from the tank to the load at the same time.

Figure 7A:
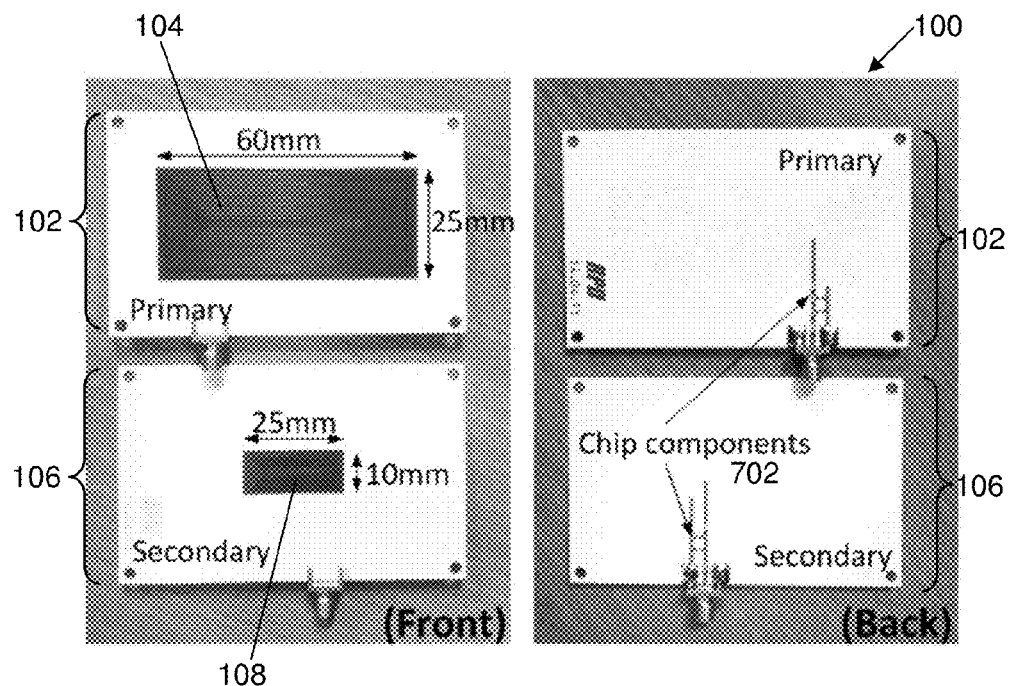
FIG. 7a shows a fabricated inductive coupling structure according to one embodiment.
Figure 7B:
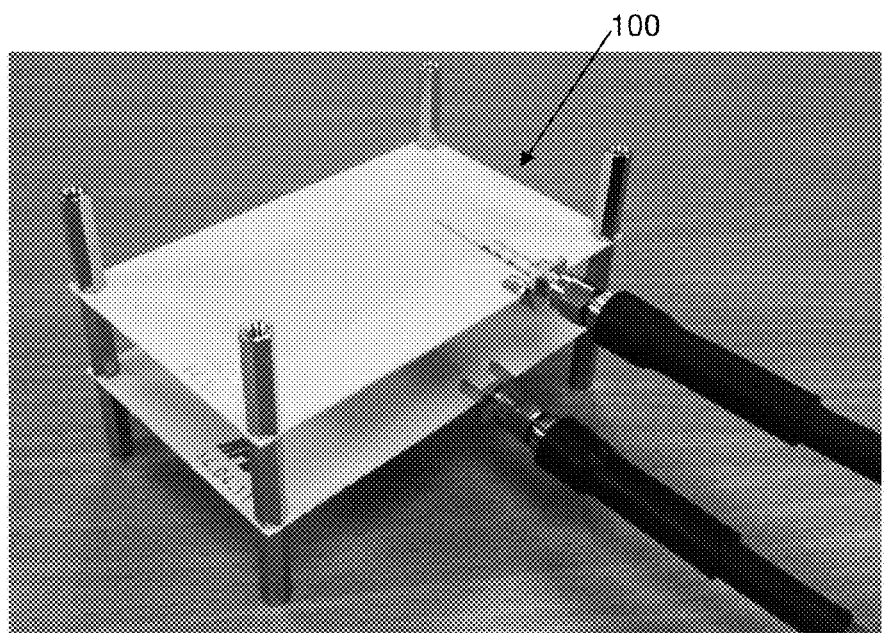
FIG. 7b shows a fabricated inductive coupling structure placed in an air environment according to one embodiment.

A fabricated inductive coupling structure (e.g. circuit arrangement 100) by optimal resonant load transformation is shown in FIG. 7a. In one embodiment, printed spiral coil is chosen for inductive coupling owing to its low profile and integration convenience. The primary coil 104 of the primary side 102 of the circuit arrangement 100 and the secondary coil 108 of the secondary side 106 of the circuit arrangement 100 are fabricated on 0.5-mm thick RO4350B printed circuit board (PCB) with 1 oz copper. The primary coil 104 may have a dimension of 60 mm×25 mm. The secondary coil 108 may have a dimension of 25 mm×10 mm. The primary coil 104 and the secondary coil 108 may have a thickness of about 0.5 mm. The optimal resonant load transformation can be realized by chip components 702 (e.g. the capacitor 114 and the inductor 112) on the coil PCB, which is easy for tuning and mass production. In one embodiment, the power carrier frequency is 13.56 MHz. The load 128 may be about 200Ω, the capacitor 114 may have a capacitance of about 56 pF and the inductor 112 may have an inductance of about 0.56 μH. Measurements of the power transfer efficiency are conducted with the fabricated inductive coupling structure (e.g. circuit arrangement 100) placed in an air environment as shown in FIG. 7b.

Figure 4:
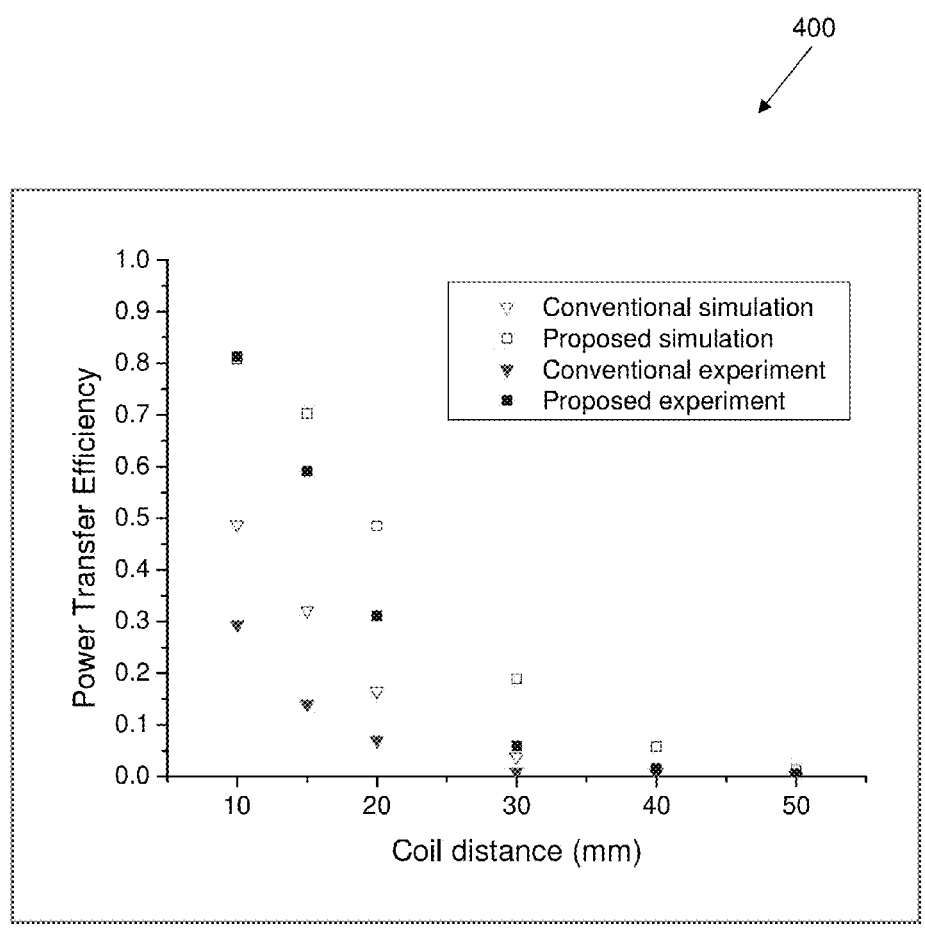
FIG. 4 shows a graph of measured power transfer efficiency plotted against coupling distance in an air environment for a circuit arrangement according to one embodiment.
Figure 7C:
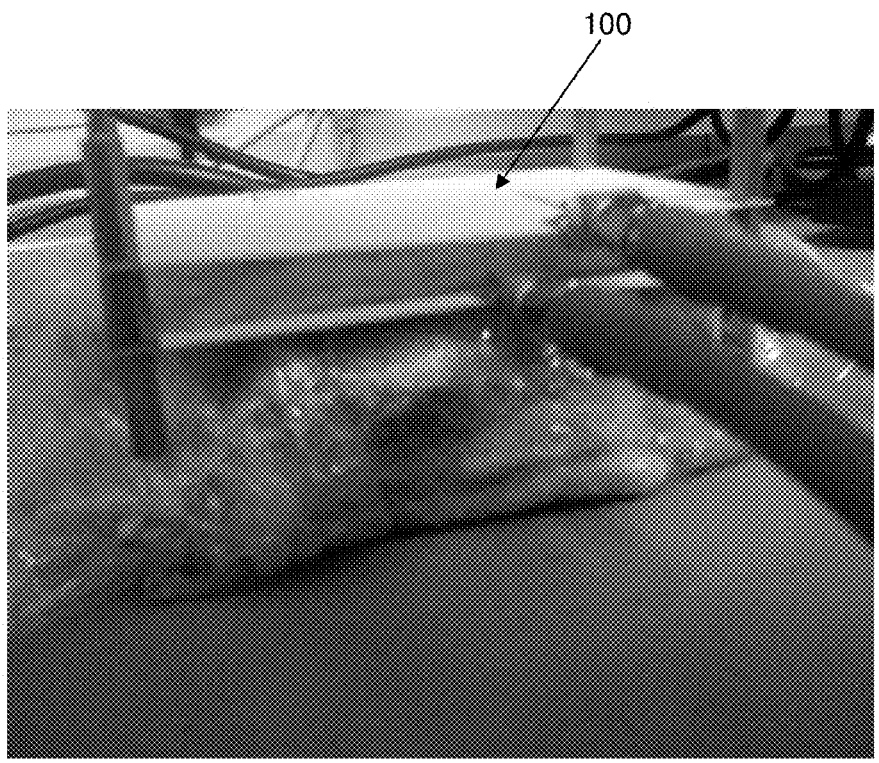
FIG. 7c shows a fabricated inductive coupling structure placed in a tissue environment according to one embodiment.

FIG. 4 shows a graph 400 of the measured power transfer efficiency plotted against coil distance/coupling distance (e.g. a distance/gap between the primary coil 104 and the secondary coil 108) in an air environment. It can be observed from graph 400 that the simulation results (represented by □) and the experimental results (represented by ■) of the circuit arrangement 100 are better than the simulation results (represented by ∇) and the experimental results (represented by ▼) of the conventional resonant coupling arrangement 220. In other words, as the coil distance increases, the circuit arrangement 100 has a higher power transfer efficiency than the conventional resonant coupling arrangement 220. More than 80% of the efficiency can be achieved in the air environment. The results are also verified with the fabricated inductive coupling structure (e.g. circuit arrangement 100) in a tissue environment as shown in FIG. 7c.

FIG. 5 shows a table 500 of experimental results of the circuit arrangement 100 in both the air environment and the tissue environment and with different coil distance/coupling distance (e.g. a distance/gap between the primary coil 104 and the secondary coil 108). The experiment may be carried with a resonant frequency of about 13.56 MHz and a load 128 of about 50 Ω.

Row 502 shows that the circuit arrangement 100 has a voltage transfer gain of −1.252 dB and a power transfer efficiency of 75.0% in an air environment and with a coil distance of 10 mm. Row 504 shows that the circuit arrangement 100 has a voltage transfer gain of −2.348 dB and a power transfer efficiency of 58.2% in a tissue environment and with a coil distance of 10 mm. Row 506 shows that the circuit arrangement 100 has a voltage transfer gain of −6.885 dB and a power transfer efficiency of 20.5% in an air environment and with a coil distance of 20 mm. Row 508 shows that the circuit arrangement 100 has a voltage transfer gain of −7.370 dB and a power transfer efficiency of 18.3% in a tissue environment and with a coil distance of 20 mm. Row 510 shows that the circuit arrangement 100 has a voltage transfer gain of −23.578 dB and a power transfer efficiency of 0.44% in an air environment and with a coil distance of 50 mm. Row 512 shows that the circuit arrangement 100 has a voltage transfer gain of −27.921 dB and a power transfer efficiency of 0.16% in a tissue environment and with a coil distance of 50 mm.

It can be observed that the voltage transfer gain and the power transfer efficiency decrease in both the air environment and the tissue environment as the coil distance becomes larger. The voltage transfer gain in the air environment is greater than the voltage transfer gain in the tissue environment. The power transfer efficiency in the air environment is greater than the power transfer efficiency in the tissue environment.

Figure 2C:
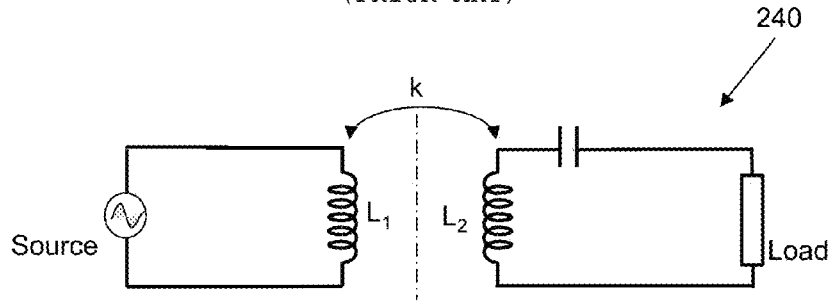
Figure 6:
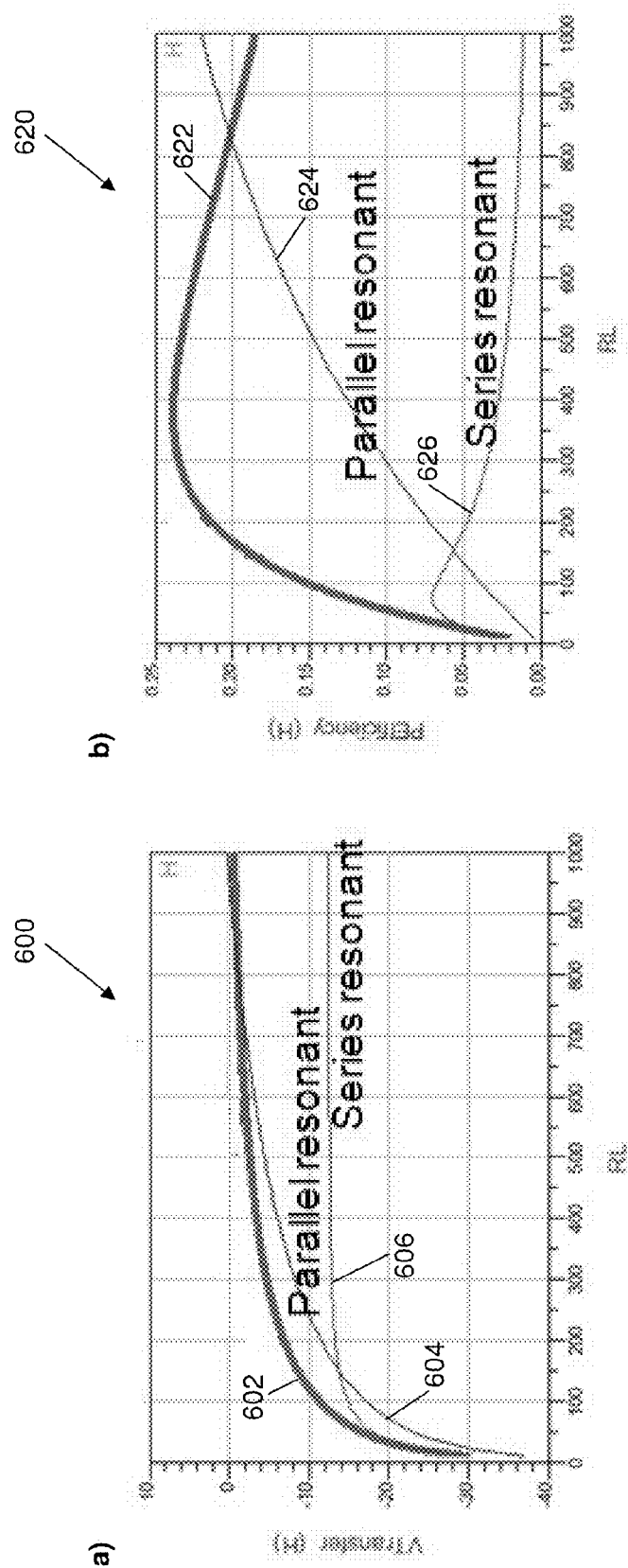
FIG. 6a shows a graph of voltage transfer gain plotted against load for a circuit arrangement according to one embodiment.
FIG. 6b shows a graph of power transfer efficiency plotted against load for a circuit arrangement according to one embodiment.

FIG. 6a shows a graph 600 of voltage transfer gain plotted against load $R_L$. Graph 600 shows a plot 602 for the circuit arrangement 100, a plot 604 for the parallel resonant arrangement (e.g. the conventional resonant coupling arrangement 220 of FIG. 2b), and a plot 606 for the series resonant arrangement 240 of FIG. 2c. It can be observed that the circuit arrangement 100 has a higher voltage transfer gain than the parallel resonant arrangement 220 and the series resonant arrangement 240.

FIG. 6b shows a graph 620 of power transfer efficiency plotted against load $R_L$. Graph 620 shows a plot 622 for the circuit arrangement 100, a plot 624 for the parallel resonant arrangement (e.g. the conventional resonant coupling arrangement 220 of FIG. 2b), and a plot 626 for the series resonant arrangement 240 of FIG. 2c. It can be observed that the circuit arrangement 100 has a higher power transfer efficiency than the parallel resonant arrangement 220 and the series resonant arrangement 240.

The circuit arrangement 100 may have a 2-coil structure which uses printed spiral coil for the primary coil 104 and the secondary coil 108. The circuit arrangement 100 has a planar structure without ferrite core. Thus, the circuit arrangement 100 can be compact for planar integration and easy tuning. On the other hand, the conventional inductive coupling arrangements generally have non-planar structures which are bulky and thus, are not prone to planar integration and tuning.

Further, the circuit arrangement 100 can provide a higher power efficiency as compared with conventional inductive coupling arrangements. Thus, circuit arrangement 100 can provide a highly efficient resonant coupling. The circuit arrangement 100 can also provide a relieved stress for source driving. The circuit arrangement 100 may also be robust for variations of coupling and load impedance. The circuit arrangement 100 may be biocompatible since it does not have ferromagnetic core and high resonant current.

The circuit arrangement 100 can provide a high-efficiency wireless power transfer. The circuit arrangement 100 can be used in applications of biomedical electronics, near field communication (NFC), radio frequency identification (RFID), contactless power charging, and potential industrial applications where wireless power transfer is needed.

Rectifier

Figure 8A:
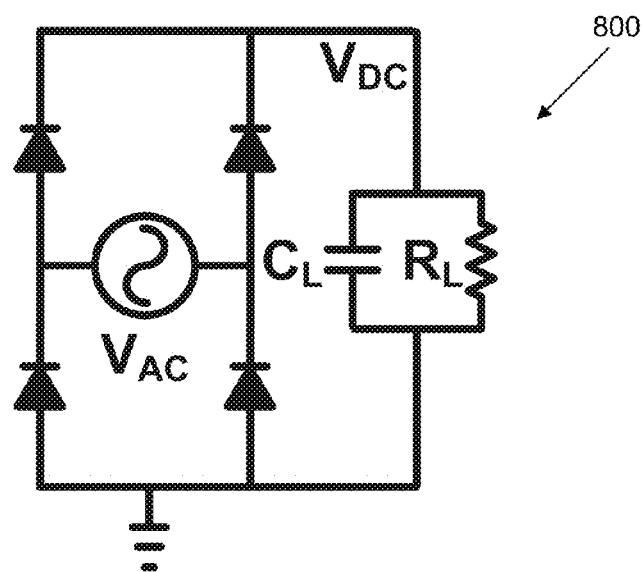
FIG. 8a shows a conventional full-wave diode-bridge rectifier.
Figure 8B:
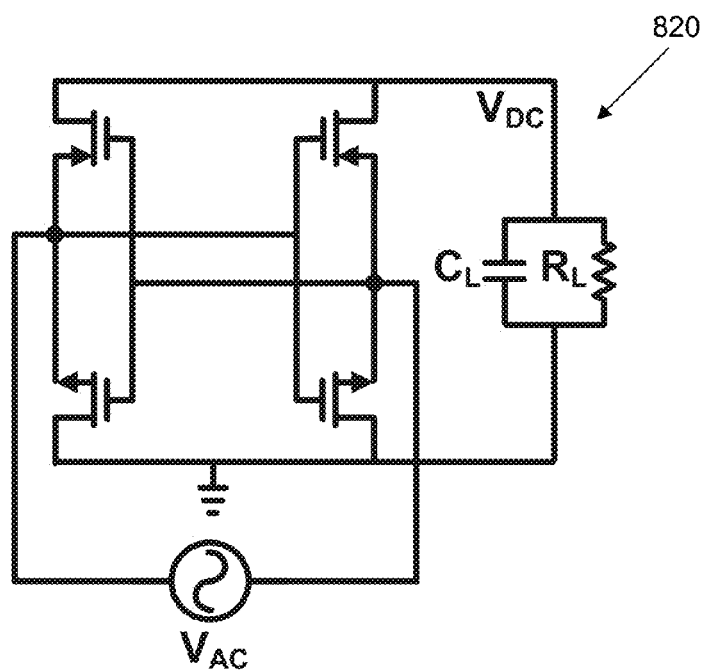
FIG. 8b shows a conventional CMOS gate-cross coupled rectifier.

FIG. 8a shows a conventional full-wave diode-bridge rectifier 800. Both Schottky and complementary metal oxide semiconductor (CMOS) types can be used in this topology. As it operates as a full-wave rectifier, the corresponding diode pair turns on during each cycle and the current flows to the output load. However, this topology has a limitation in achieving a high power conversion efficiency (PCE) due to the two threshold voltage ($V_{TH}$) drops. FIG. 8b shows a conventional CMOS gate-cross coupled rectifier 820. This topology can enable low ON-resistance in comparison to the diode-bridge structure 800. However, whenever the potential in the output node is higher than the input signal, reverse leakage current occurs in every cycle of its operation if the input transistor is not turned OFF fast enough during the ON-OFF transition. This causes a severe degradation of the power conversion efficiency of the rectifier.

Figure 8C:
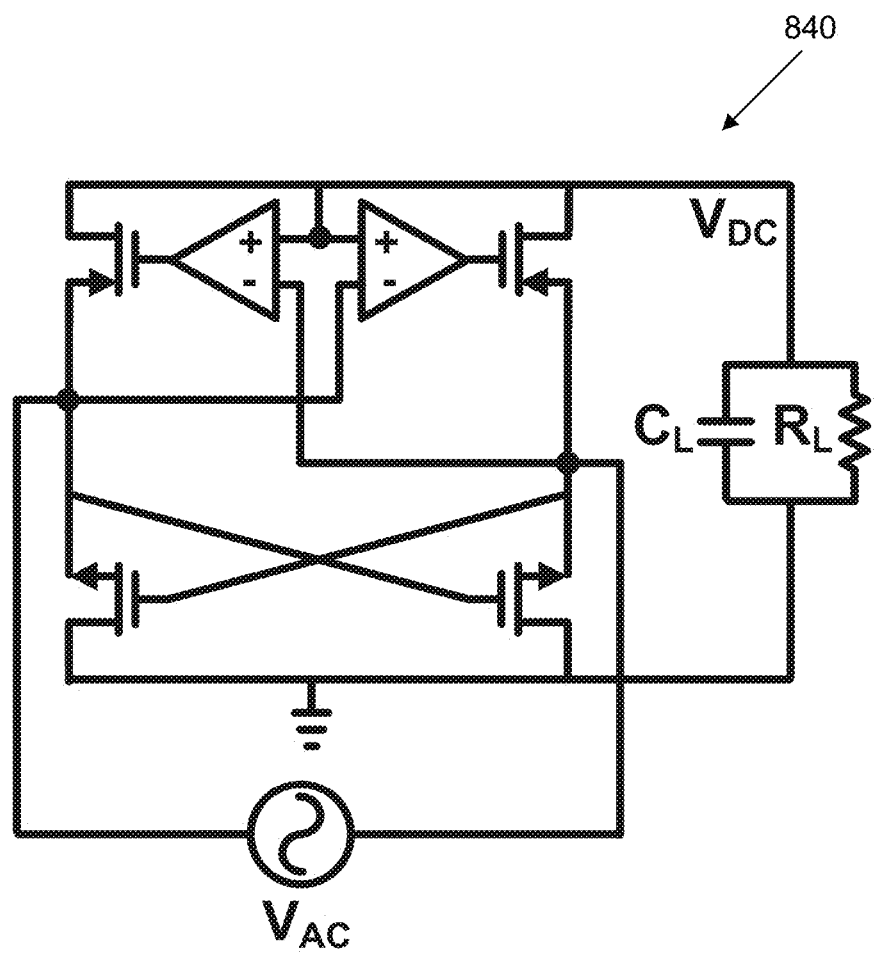
FIG. 8c shows an exemplary conventional comparator-based rectifier.

To alleviate this issue, several comparator-based rectifiers have been proposed. FIG. 8c shows an exemplary conventional comparator-based rectifier 840. In the rectifier 840, a comparator is used to drive the gate of the main transistor to control the operation in order to minimize the reverse leakage current. Many of these comparator-based topologies achieve a relatively high PCE of over 80%. However, these rectifiers operate at very low frequency and/or require a large input signal to achieve such high PCEs. The requirement of the large input signal for high efficiency limits the allowed operation distance of the rectifier. Also, this will have tissue damage/heating regulatory issues for implant applications.

Figure 9:
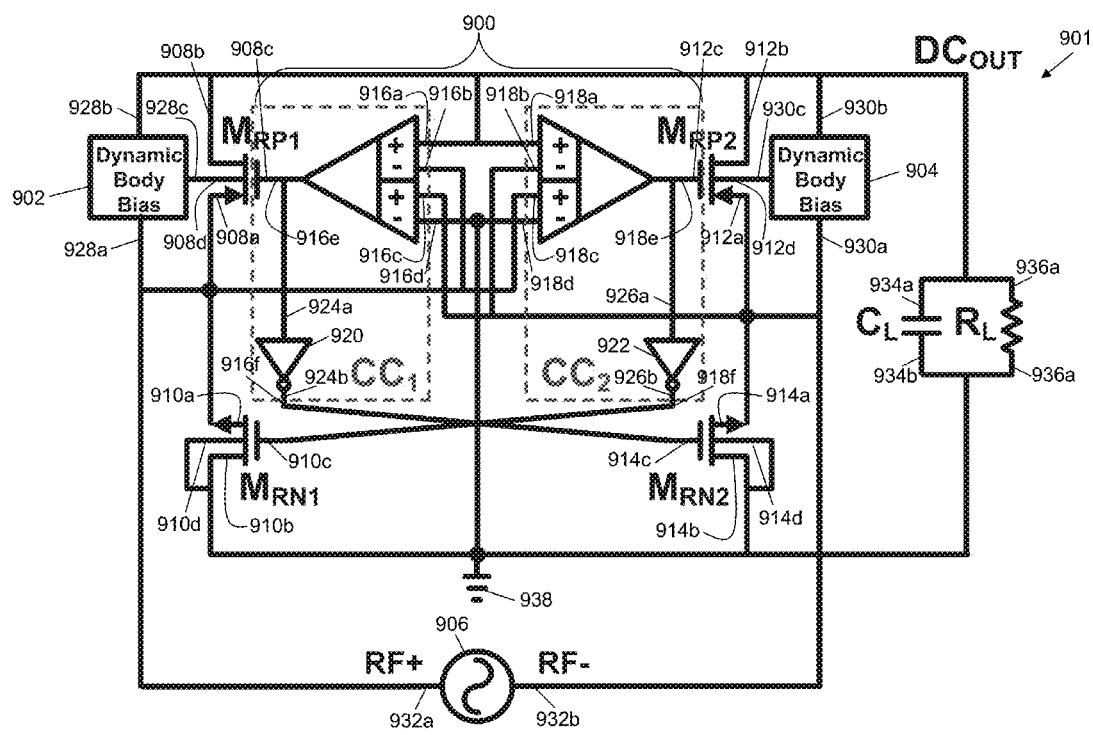
FIG. 9 shows a schematic diagram of a rectifier according to one embodiment.

FIG. 9 shows a schematic diagram of a rectifier 900 according to one embodiment. The rectifier 900 includes a first transistor $M_{RP1}$, a second transistor $M_{RN1}$, a third transistor $M_{RP2}$ and a fourth transistor $M_{RN2}$. The rectifier 900 also includes a first comparator $CC_1$ and a second comparator $CC_2$. In one embodiment, the first comparator $CC_1$ and a second comparator $CC_2$ may form a shared self-powered comparator arrangement 901. The rectifier 900 has a first dynamic body bias unit 902 and a second dynamic body bias unit 904. The rectifier 900 has a voltage source 906, a capacitor (load capacitance) $C_L$ and a resistor (load resistance) $R_L$. In one embodiment, the resistor $R_L$ is a representation of a load of the rectifier 900.

The first transistor $M_{RP1}$ has a first terminal 908a, a second terminal 908b and a control terminal 908c. The second transistor $M_{RN1}$ has a first terminal 910a, a second terminal 910b and a control terminal 910c. The third transistor $M_{RP2}$ has a first terminal 912a, a second terminal 912b and a control terminal 912c. The fourth transistor $M_{RN2}$ has a first terminal 914a, a second terminal 914b and a control terminal 914c. The first comparator $CC_1$ has a first input terminal 916a, a second input terminal 916b, a third input terminal 916c, a fourth input terminal 916d, a first output terminal 916e and a second output terminal 916f. The second comparator $CC_2$ has a first input terminal 918a, a second input terminal 918b, a third input terminal 918c, a fourth input terminal 918d, a first output terminal 918e and a second output terminal 918f.

The first input terminal 916a of the first comparator $CC_1$ is coupled to the first input terminal 918a of the second comparator $CC_2$. The second input terminal 916b of the first comparator $CC_1$ is coupled to the third input terminal 918c of the second comparator $CC_2$. The third input terminal 916c of the first comparator $CC_1$ is coupled to the second input terminal 918b of the second comparator $CC_2$. The fourth input terminal 916d of the first comparator $CC_1$ is coupled to the fourth input terminal 918d of the second comparator $CC_2$.

The first terminal 908a of the first transistor $M_{RP1}$ is coupled to the first terminal 910a of the second transistor $M_{RN1}$. The second terminal 908b of the first transistor $M_{RP1}$ is coupled to the second terminal 912b of the third transistor $M_{RP2}$. The second terminal 910b of the second transistor $M_{RN1}$ is coupled to the second terminal 914b of the fourth transistor $M_{RN2}$. The first terminal 912a of the third transistor $M_{RP2}$ is coupled to the first terminal 914a of the fourth transistor $M_{RN2}$.

The first output terminal 916e of the first comparator $CC_1$ is coupled to the control 908c terminal of the first transistor $M_{RP1}$. The second output terminal 916f of the first comparator $CC_1$ is coupled to the control terminal 914c of the fourth transistor $M_{RN2}$. The first output terminal 918e of the second comparator $CC_2$ is coupled to the control terminal 912c of the third transistor $M_{RP2}$. The second output terminal 918f of the second comparator $CC_2$ is coupled to the control terminal 908c of the second transistor $M_{RN1}$.

In one embodiment, the first comparator $CC_1$ includes a first NOT gate 920 and the second comparator $CC_2$ includes a second NOT gate 922. The first NOT gate 920 has an input terminal 924a and an output terminal 924b. The second NOT gate 922 has an input terminal 926a and an output terminal 926b. The input terminal 924a of the first NOT gate 920 is coupled to the first output terminal 916e of the first comparator $CC_1$ and the output terminal 924b of the first NOT gate 920 is coupled to the second output terminal 916f of the first comparator $CC_1$. The input terminal 926a of the second NOT gate 922 is coupled to the first output terminal 918e of the second comparator $CC_2$ and the output terminal 926b of the second NOT gate 922 is coupled to the second output terminal 918f of the second comparator $CC_2$.

Further, the first transistor $M_{RP1}$, the second transistor $M_{RPN1}$, the third transistor $M_{RP2}$ and the fourth transistor $M_{RN2}$ respectively includes a third terminal 908d, 910d, 912d, 914d. The first dynamic body bias unit 902 has a first terminal 928a, a second terminal 928b and a third terminal 928c. The second dynamic body bias unit 904 a first terminal 930a, a second terminal 930b and a third terminal 930c. The first terminal 928a of the first dynamic body bias unit 902 is coupled to the first terminal 908a of the first transistor $M_{RP1}$, the first terminal 910a of the second transistor $M_{RN1}$, the second input terminal 916b of the first comparator $CC_1$ and the third input terminal 918c of the second comparator $CC_2$. The second terminal 928b of the first dynamic body bias unit 902 is coupled to the second terminal 908b of the first transistor $M_{RP1}$, the first input terminal 916a of the first comparator $CC_1$, the first input terminal 918a of the second comparator $CC_2$, the second terminal 912b of the third transistor $M_{RP2}$ and the second terminal 930b of the second dynamic body bias unit 904. The third terminal 928d of the first dynamic body bias unit 902 is coupled to the third terminal 908d of the first transistor $M_{RP1}$. The first terminal 930a of the second dynamic body bias unit 904 is coupled to the first terminal 912a of the third transistor $M_{RP2}$, the first terminal 914a of the fourth transistor $M_{RN2}$, the third input terminal 916d of the first comparator $CC_1$ and the second input terminal 918b of the second comparator $CC_2$. The third terminal 930c of the second dynamic body bias unit 904 is coupled to the third terminal 912d of the third transistor $M_{RP2}$. The third second terminal 910b of the second transistor $M_{RPN1}$, and the third terminal 914d of the fourth transistor $M_{RN2}$ is coupled to the second terminal 914b of the fourth transistor $M_{RN2}$.

The voltage source 906 has a first terminal 932a and a second terminal 932b. The first terminal 932a of the voltage source 906 is coupled to the first terminal 928a of the first dynamic body bias unit 902, the first terminal 908a of the first transistor $M_{RP1}$, the first terminal 910a of the second transistor $M_{RN1}$, the second input terminal 916b of the first comparator $CC_1$ and the third input terminal 918c of the second comparator $CC_2$. The second terminal 932b of the voltage source 906 is coupled to the first terminal 930a of the second dynamic body bias unit 904, the first terminal 912a of the third transistor $M_{RP2}$, the first terminal 914a of the fourth transistor $M_{RN2}$, the third input terminal 916c of the first comparator $CC_1$ and the second input terminal 918b of the second comparator $CC_2$.

In one embodiment, the voltage source 906 may be an AC input voltage source. The voltage source 906 of the rectifier 900 may be a representation of a circuit to which an input of the rectifier 900 is coupled. In other words, the voltage supplied by the voltage source 906 may be an output voltage of this circuit. Therefore, the first terminal 932a and the second terminal 932b of the voltage source 906 may be the first input terminal and the second input terminal of the rectifier 900. The voltage source 906 may apply a voltage of RF+ to the second input terminal 916b of the first comparator $CC_1$ and the third input terminal 918c of the second comparator $CC_2$. The voltage source 906 may apply a voltage of RF− to the third input terminal 916c of the first comparator $CC_1$ and the second input terminal 918b of the second comparator $CC_2$.

The capacitor $C_L$ has a first terminal 934a and a second terminal 934b, and the resistor $R_L$ has a first terminal 936a and a second terminal 936b. As the resistor $R_L$ may be a representative of a load of the rectifier 900, the first terminal 936a and the second terminal 936b of the resistor $R_L$ may be a first output terminal and a second output terminal of the rectifier 900 respectively. The first terminal 934a of the capacitor $C_L$ is coupled to the first terminal 936a of the resistor $R_L$ and the second terminal 930b of the second dynamic body bias unit 904. The second terminal 934b of the capacitor $C_L$ is coupled to the second terminal 936b of the resistor $R_L$, the second terminal 910b of the second transistor $M_{RN1}$, the fourth input terminal 916d of the first comparator $CC_1$, the fourth input terminal 918d of the second comparator $CC_2$ and the second terminal 914b of the fourth transistor $M_{RN2}$.

The second terminal 934b of the capacitor $C_L$, the second terminal 936b of the resistor $R_L$, the second terminal 910b of the second transistor $M_{RN1}$, the fourth input terminal 916d of the first comparator $CC_1$, the fourth input terminal 918d of the second comparator $CC_2$ and the second terminal 914b of the fourth transistor $M_{RN2}$ are coupled to a reference voltage 938. The reference voltage 938 may be ground.

In one embodiment, the first transistor $M_{RP1}$ and the third transistor $M_{RP2}$ may be p-channel metal-oxide-semiconductor field-effect transistors (PMOS). The second transistor $M_{RN1}$ and the fourth transistor $M_{RN2}$ may be n-channel metal-oxide-semiconductor field-effect transistors (NMOS). The first terminal 908a of the first transistor $M_{RP1}$, the first terminal 910a of the second transistor $M_{RN1}$, the first terminal 912a of the third transistor $M_{RP2}$ and the first terminal 914a of the fourth transistor $M_{RN2}$ may be source terminals. The second terminal 908b of the first transistor $M_{RP1}$, the second terminal 910b of the second transistor $M_{RN1}$, the second terminal 912b of the third transistor $M_{RP2}$ and the second terminal 914b of the fourth transistor $M_{RN2}$ may be drain terminals. The control terminal 908c of the first transistor $M_{RP1}$, the control terminal 910c of the second transistor $M_{RN1}$, the control terminal 912c of the third transistor $M_{RP2}$ and the control terminal 914c of the fourth transistor $M_{RN2}$ may be gate terminals. The third terminal 908d of the first transistor $M_{RP1}$, the third terminal 910d of the second transistor $M_{RN1}$, the third terminal 912d of the third transistor $M_{RP2}$ and the third terminal 914d of the fourth transistor $M_{RN2}$ may be body terminals.

Figure 10:
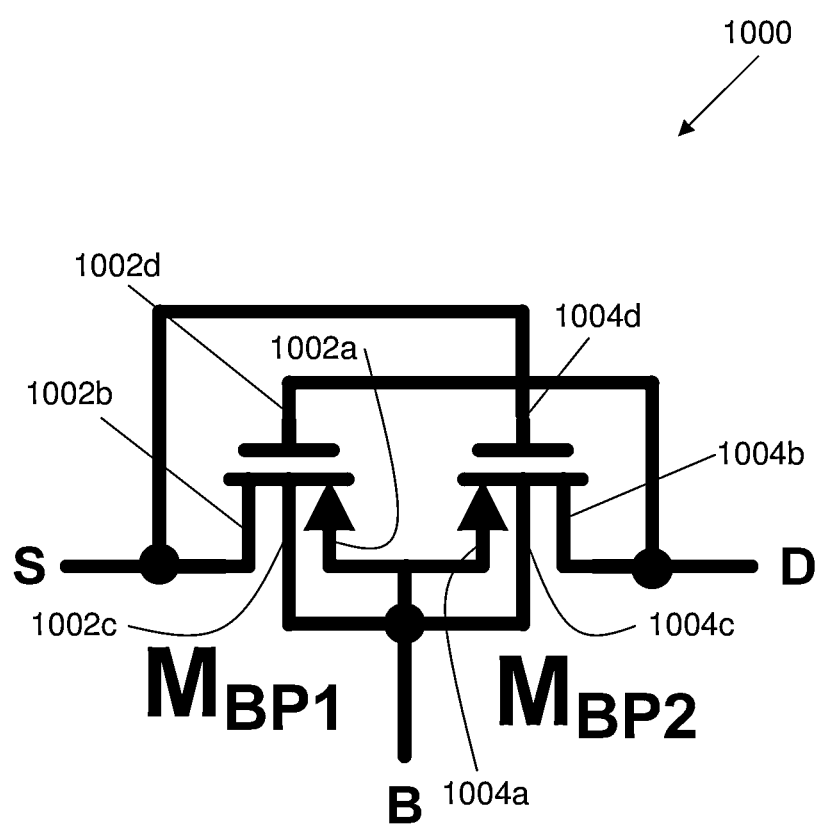
FIG. 10 shows a circuit arrangement of a dynamic body bias unit for a rectifier according to one embodiment.

In one embodiment, the first dynamic body bias unit 902 has a circuit arrangement 1000 as shown in FIG. 10. The circuit arrangement 1000 has a first transistor $M_{BP1}$ having a first terminal 1002a, a second terminal 1002b, a third terminal 1002c and a control terminal 1002d, and a second terminal $M_{BP2}$ having a first terminal 1004a, a second terminal 1004b, a third terminal 1004c and a control terminal 1004d. The first terminal 1002a of the first transistor $M_{BP1}$ is coupled to the first terminal 1004a of the second transistor $M_{BP2}$. The second terminal 1002b of the first transistor $M_{BP1}$ is coupled to the control terminal 1004d of the second transistor $M_{BP2}$. The third terminal 1002c of the first transistor $M_{BP1}$ is coupled to the third terminal 1004c of the second transistor $M_{BP2}$, the first terminal 1002a of the first transistor $M_{BP1}$ and the first terminal 1004a of the second transistor $M_{BP2}$. The control terminal 1002d of the first transistor $M_{BP1}$ is coupled to the second terminal 1004b of the second transistor $M_{BP2}$.

The first transistor $M_{BP1}$ and the second transistor $M_{BP2}$ may be p-channel metal-oxide-semiconductor field-effect transistors (PMOS). The first terminal 1002a of the first transistor $M_{BP1}$ and the first terminal 1004a of the second transistor $M_{BP2}$ may be source terminals. The second terminal 1002b of the first transistor $M_{BP1}$ and the second terminal 1004b of the second transistor $M_{BP2}$ may be drain terminals. The third terminal 1002c of the first transistor $M_{BP1}$ and the third terminal 1004c of the second transistor $M_{BP2}$ may be body terminals. The control terminal 1002d of the first transistor $M_{BP1}$ and the control terminal 1004d of the second transistor $M_{BP2}$ may be gate terminals.

In one embodiment, the first terminal of the first dynamic body bias unit 902 may be coupled to the second terminal 1002b of the first transistor $M_{BP1}$ and the control terminal 1004d of the second transistor $M_{BP2}$. The second terminal of the first dynamic body bias unit 902 may be coupled to the control terminal 1002 of the first transistor $M_{BP1}$ and the second terminal 1004b of the second transistor $M_{BP2}$. The third terminal of the first dynamic body bias unit 902 may be coupled to the first terminal 1002a of the first transistor $M_{BP1}$, the first terminal 1004a of the second transistor $M_{BP2}$, the third terminal 1002c of the first transistor $M_{BP1}$ and the third terminal 1004c of the second transistor $M_{BP2}$.

The second dynamic body bias unit 904 may have an identical or a similar circuit arrangement (e.g. circuit arrangement 1000) as the first dynamic body bias unit 902. In one embodiment, the first terminal of the second dynamic body bias unit 904 may be coupled to the second terminal 1002b of the first transistor $M_{BP1}$ and the control terminal 1004d of the second transistor $M_{BP2}$. The second terminal of the second dynamic body bias unit 904 may be coupled to the control terminal 1002 of the first transistor $M_{BP1}$ and the second terminal 1004b of the second transistor $M_{BP2}$. The third terminal of the second dynamic body bias unit 904 may be coupled to the first terminal 1002a of the first transistor $M_{BP1}$, the first terminal 1004a of the second transistor $M_{BP2}$, the third terminal 1002c of the first transistor $M_{BP1}$ and the third terminal 1004c of the second transistor $M_{BP2}$.

In one embodiment, the rectifier 900 may include active NMOS diodes (e.g. the second transistor $M_{RN1}$ and the fourth transistor $M_{RN2}$) and PMOS diodes (e.g. the first transistor $M_{RP1}$ and the third transistor $M_{RP2}$) operating as switches in which the gates are driven by a shared self-powered comparator arrangement 901 (e.g. formed by the first comparator $CC_1$ and the second comparator $CC_2$) which does not require external supplies. In the positive cycle of the operation of the rectifier 900, the voltage RF+ of the voltage source 906 is high. The voltage RF+ may be applied to the second input terminal 916b of the first comparator $CC_1$ and the third input terminal 918c of the second comparator $CC_2$. The output at the first output terminal 916e of the first comparator $CC_1$ will be low to turn on the first transistor $M_{RP1}$. The output at the second output terminal 916f of the first comparator $CC_1$ after the inverter (e.g. the first NOT gate 920) will be high to turn on the fourth transistor $M_{RN2}$. The current in the forward direction will flow to the load consisting of the resistor $R_L$, and the capacitor $C_L$ to produce the rectified DC output voltage. At this positive cycle of the operation of the rectifier 900, the output of the second comparator $CC_2$ will be opposite to turn both the second transistor $M_{RN1}$ and the third transistor $M_{RP2}$ off. That is, the output at the first output terminal 918e of the second comparator $CC_2$ will be high to turn off the third transistor $M_{RP2}$, and the output at the second output terminal 918f of the second comparator $CC_2$ will be low to turn off the second transistor $M_{RN1}$.

In the negative cycle of the operation of the rectifier 900, the voltage RF+ of the voltage source 906 is low. The output at the first output terminal 916e of the first comparator $CC_1$ will be high to turn off the first transistor $M_{RP1}$. The output at the second output terminal 916f of the first comparator $CC_1$ will be low to turn off the fourth transistor $M_{RN2}$. The output at the first output terminal 918e of the second comparator $CC_2$ will be low to turn on the third transistor $M_{RP2}$, and the output at the second output terminal 918f of the second comparator $CC_2$ will be high to turn on the second transistor $M_{RN1}$. The current in the reverse direction will flow to the load consisting of the resistor $R_L$ and the capacitor $C_L$ to produce the rectified DC output voltage.

However, if DC output voltage is higher than the input AC voltage while the transition (switching time of the PMOS $M_{RP1}$, $M_{RP2}$ and NMOS switches $M_{RN1}$, $M_{RN2}$) from one operation cycle to the next operation cycle is not fast enough, this may result in a reverse leakage current flowing out from the output load to the input which may greatly degrade the efficiency of the rectifier 900. The transition time can be decided by how fast the comparator arrangement 901 (e.g. the first comparator $CC_1$ and the second comparator $CC_2$) operates. Therefore, a design of the first comparator $CC_1$ and the second comparator $CC_2$ can affect the power conversion efficiency (PCE) of the rectifier 900.

Figure 11:
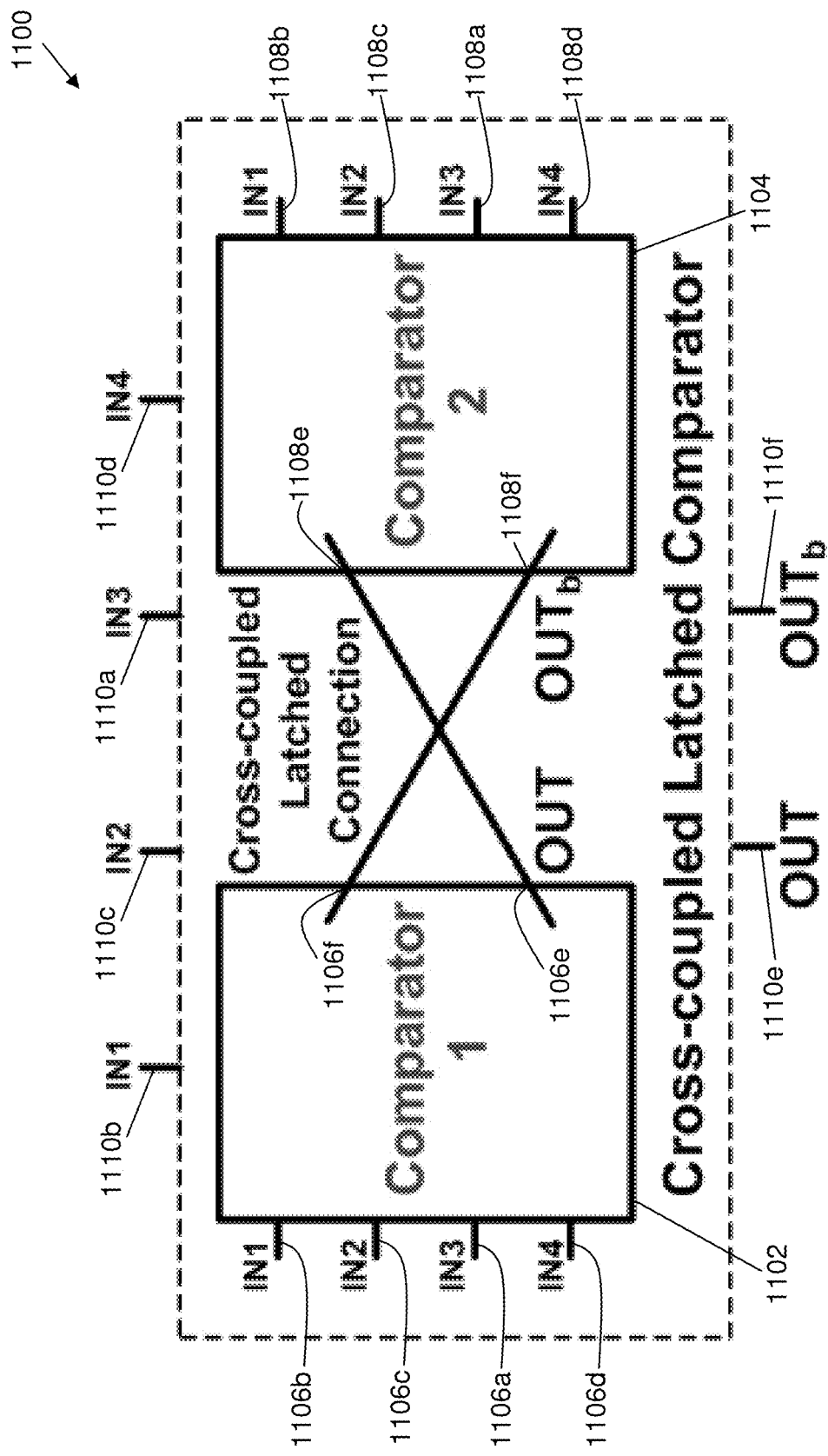
FIG. 11 shows a block diagram of a comparator for a rectifier according to one embodiment.

FIG. 11 shows a block diagram of a comparator 1100 for the rectifier 900. The comparator 1100 may correspond to each of the first comparator $CC_1$ and the second comparator $CC_2$ of the rectifier 900. The comparator 1100 includes a main comparator unit 1102 and a secondary comparator unit 1104. The main comparator unit 1102 has a first input terminal 1106a, a second input terminal 1106b, a third input terminal 1106c, a fourth input terminal 1106d, a first output terminal 1106e and a second output terminal 1106f. The secondary comparator unit 1104 has a first input terminal 1108a, a second input terminal 1108b, a third input terminal 1108c, a fourth input terminal 1108d, a first output terminal 1108e and a second output terminal 1108f.

The main comparator unit 1102 and the secondary comparator unit 1104 are coupled in a cross-coupled latched connection. The first output terminal 1106e of the main comparator unit 1102 is coupled to the first output terminal 1108e of the secondary comparator unit 1104. The second output terminal 1106f of the main comparator unit 1102 is coupled to the second output terminal 1108f of the secondary comparator unit 1104. Thus, the second output terminal 1106e of the main comparator unit 1102 is an input terminal of the capacitively coupled output stage of the main comparator unit 1102, and the first output terminal 1108e of the secondary comparator unit 1104 is the input terminal of the capacitively coupled output stage of the secondary comparator unit 1104.

In one embodiment, the comparator 1100 may be considered to have a first input terminal 1110a, a second input terminal 1110b, a third input terminal 1110c, a fourth input terminal 1110d, a first output terminal 1110e and a second output terminal 1110f. For example, the first comparator $CC_1$ has a first input terminal 916a, a second input terminal 916b, a third input terminal 916c, a fourth input terminal 916d, a first output terminal 916e and a second output terminal 916f. The second comparator $CC_2$ has a first input terminal 918a, a second input terminal 918b, a third input terminal 918c, a fourth input terminal 918d, a first output terminal 918e and a second output terminal 918f.

The reason may be because a same voltage may be applied at the first input terminal 1106a of the main comparator unit 1102 and the first input terminal 1108a of the secondary comparator unit 1104, a same voltage may be applied at the second input terminal 1106b of the main comparator unit 1102 and the second input terminal 1108b of the secondary comparator unit 1104, a same voltage may be applied at the third input terminal 1106c of the main comparator unit 1102 and the third input terminal 1108c of the secondary comparator unit 1104, a same voltage may be applied at the fourth input terminal 1106d of the main comparator unit 1102 and the fourth input terminal 1108d of the secondary comparator unit 1104. Also, a same voltage may be measured at the first output terminal 1106e of the main comparator unit 1102 and the first output terminal 1108e of the secondary comparator unit 1104 and a same voltage may be measured at the second output terminal 1106f of the main comparator unit 1102 and the second output terminal 1108f of the secondary comparator unit 1104.

With reference to FIG. 9, the voltages applied at two input terminals of the comparator 1100 provide a reference voltage for the comparator (e.g. DCout and GND) and the voltages applied at two other input terminals of the comparator 1100 are input voltage RF (e.g. RF+ and RF−). The comparator 1100 can compare the reference voltage and the input voltage. Details of the operation of the comparator will be described in the later part of the description.

Figure 12:
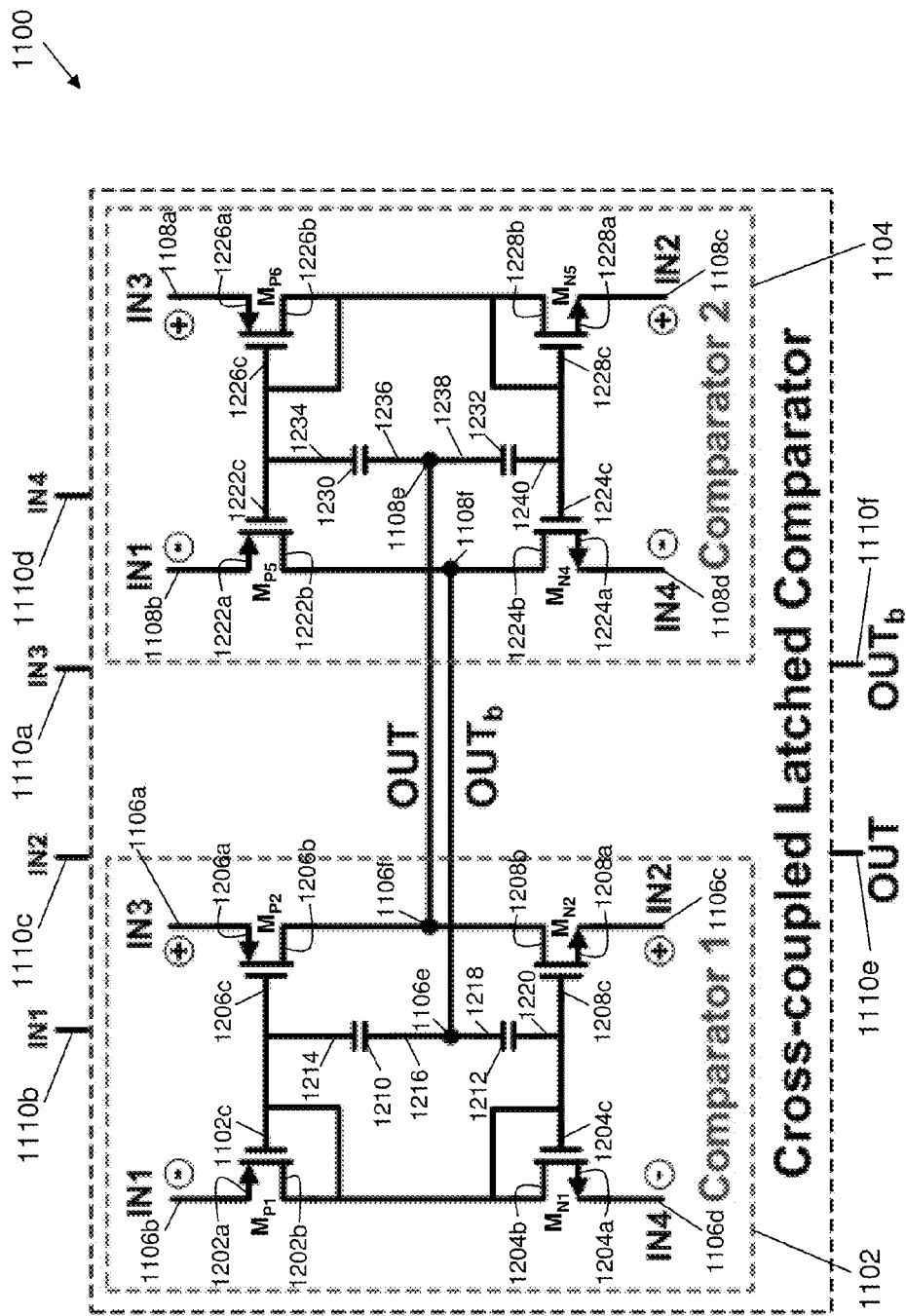
FIG. 12 shows a general schematic diagram of a comparator for a rectifier according to one embodiment.

FIG. 12 shows a general schematic diagram of the comparator 1100. The main comparator unit 1102 of the comparator has a first transistor $M_{P1}$, a second transistor $M_{N1}$, a third transistor $M_{P2}$ and a fourth transistor $M_{N2}$. The first transistor $M_{P1}$ has a first terminal 1202a, a second terminal 1202b and a control terminal 1202c. The second transistor $M_{N1}$ has a first terminal 1204a, a second terminal 1204b and a control terminal 1204c. The third transistor $M_{P2}$ has a first terminal 1206a, a second terminal 1206b and a control terminal 1206c. The fourth transistor $M_{N2}$ has a first terminal 1208a, a second terminal 1208b and a control terminal 1208c.

The first terminal 1202a of the first transistor $M_{P1}$ is coupled to the second input terminal 1106b of the main comparator unit 1102. The second terminal 1202b of the first transistor $M_{P1}$ is coupled to the control terminal 1202c of the first transistor $M_{P1}$, the second terminal 1204b of the second transistor $M_{N1}$, the control terminal 1204c of the second transistor $M_{N1}$, the control terminal 1206c of the third transistor $M_{P2}$ and the control terminal 1208c of the fourth transistor $M_{N2}$. The first terminal 1204a of the second transistor $M_{N1}$ is coupled to the fourth input terminal 1106d of the main comparator unit 1102. The first terminal 1206a of the third transistor $M_{P2}$ is coupled to the first input terminal 1106a of the main comparator unit 1102. The second terminal 1206b of the third transistor $M_{P2}$ is coupled to the second terminal 1208b of the fourth transistor $M_{N2}$. The first terminal 1208a of the fourth transistor $M_{N2}$ is coupled to the third input terminal 1106c of the main comparator unit 1102.

The main comparator unit 1102 further includes a first capacitor 1210 and a second capacitor 1212. The first capacitor 1210 has a first terminal 1214 and a second terminal 1216. The second capacitor 1212 has a first terminal 1218 and a second terminal 1220. The first terminal 1214 of the first capacitor 1210 is coupled to the control terminal 1202c of the first transistor $M_{P1}$ and the control terminal 1206c of the third transistor $M_{P2}$. The second terminal 1216 of the first capacitor 1210 is coupled to the first terminal 1218 of the second capacitor 1212. The second terminal 1220 of the second capacitor 1212 is coupled to the control terminal 1204c of the second transistor $M_{N1}$ and the control terminal 1208c of the fourth transistor $M_{N2}$.

The first output terminal 1106e of the main comparator unit 1102 is coupled between the second terminal 1206b of the third transistor $M_{P2}$ and the second terminal 1208b of the fourth transistor $M_{N2}$. The second output terminal 1106f of the main comparator unit 1102 is coupled between the second terminal 1216 of the first capacitor 1210 and the first terminal 1218 of the second capacitor 1212.

The secondary comparator unit 1104 of the comparator 1100 has a first transistor $M_{P5}$, a second transistor $M_{N4}$, a third transistor $M_{P6}$ and a fourth transistor $M_{N5}$. The first transistor $M_{P5}$ has a first terminal 1222a, a second terminal 1222b and a control terminal 1222c. The second transistor $M_{N4}$ has a first terminal 1224a, a second terminal 1224b and a control terminal 1224c. The third transistor $M_{P6}$ has a first terminal 1226a, a second terminal 1226b and a control terminal 1226c. The fourth transistor $M_{N5}$ has a first terminal 1228a, a second terminal 1228b and a control terminal 1228c.

The first terminal 1222a of the first transistor $M_{P5}$ is coupled to the second input terminal 1108b of the secondary comparator unit 1104. The second terminal 1222b of the first transistor $M_{P5}$ is coupled to the second terminal 1224b of the second transistor $M_{N4}$. The control terminal 1222c of the first transistor $M_{P5}$ is coupled to the control terminal 1226c of the third transistor $M_{P6}$, the second terminal 1226b of the third transistor $M_{P6}$, the second terminal 1228b of the fourth transistor $M_{N5}$, the control terminal 1228c of the fourth transistor $M_{N5}$ and the control terminal 1224c of the second transistor $M_{N4}$. The first terminal 1224a of the second transistor $M_{N4}$ is coupled to the fourth input terminal 1108d of the secondary comparator unit 1104. The first terminal 1226a of the third transistor $M_{P6}$ is coupled to the first input terminal 1108a of the secondary comparator unit 1104. The first terminal 1228a of the fourth transistor $M_{N5}$ is coupled to the third input terminal 1108c of the secondary comparator unit 1104.

The secondary comparator unit 1104 further includes a first capacitor 1230 and a second capacitor 1232. The first capacitor 1230 has a first terminal 1234 and a second terminal 1236. The second capacitor 1232 has a first terminal 1238 and a second terminal 1240. The first terminal 1234 of the first capacitor 1230 is coupled to the control terminal 1222c of the first transistor $M_{P5}$ and the control terminal 1226c of the third transistor $M_{P6}$. The second terminal 1236 of the first capacitor 1230 is coupled to the first terminal 1238 of the second capacitor 1232. The second terminal 1240 of the second capacitor 1232 is coupled to the control terminal 1224c of the second transistor $M_{N4}$ and the control terminal 1228c of the fourth transistor $M_{N5}$.

In one embodiment, the third transistor MP2 and the fourth transistor MN2 of the main comparator unit 1102 may form an output stage of the main comparator unit 1102. The first transistor MP5 and the second transistor MN4 of the secondary comparator unit 1104 may form an output stage of the secondary comparator unit 1104. The capactively coupled input terminal 1108e of the output stage of the secondary comparator unit 1104 is coupled between the second terminal 1236 of the first capacitor 1230 and the first terminal 1238 of the second capacitor 1232. The output terminal 1108f of the secondary comparator unit 1104 is coupled between the second terminal 1222b of the first transistor $M_{P5}$ and the second terminal 1224b of the second transistor $M_{N4}$.

The capacitively coupled input terminal 1106e of the output stage of the main comparator unit 1102 is coupled to the capacitively coupled input terminal 1108e of the output stage of the secondary comparator unit 1104. The output terminal 1106f of the main comparator unit 1102 is coupled to the second output terminal 1108f of the secondary comparator unit 1104.

Figure 13:
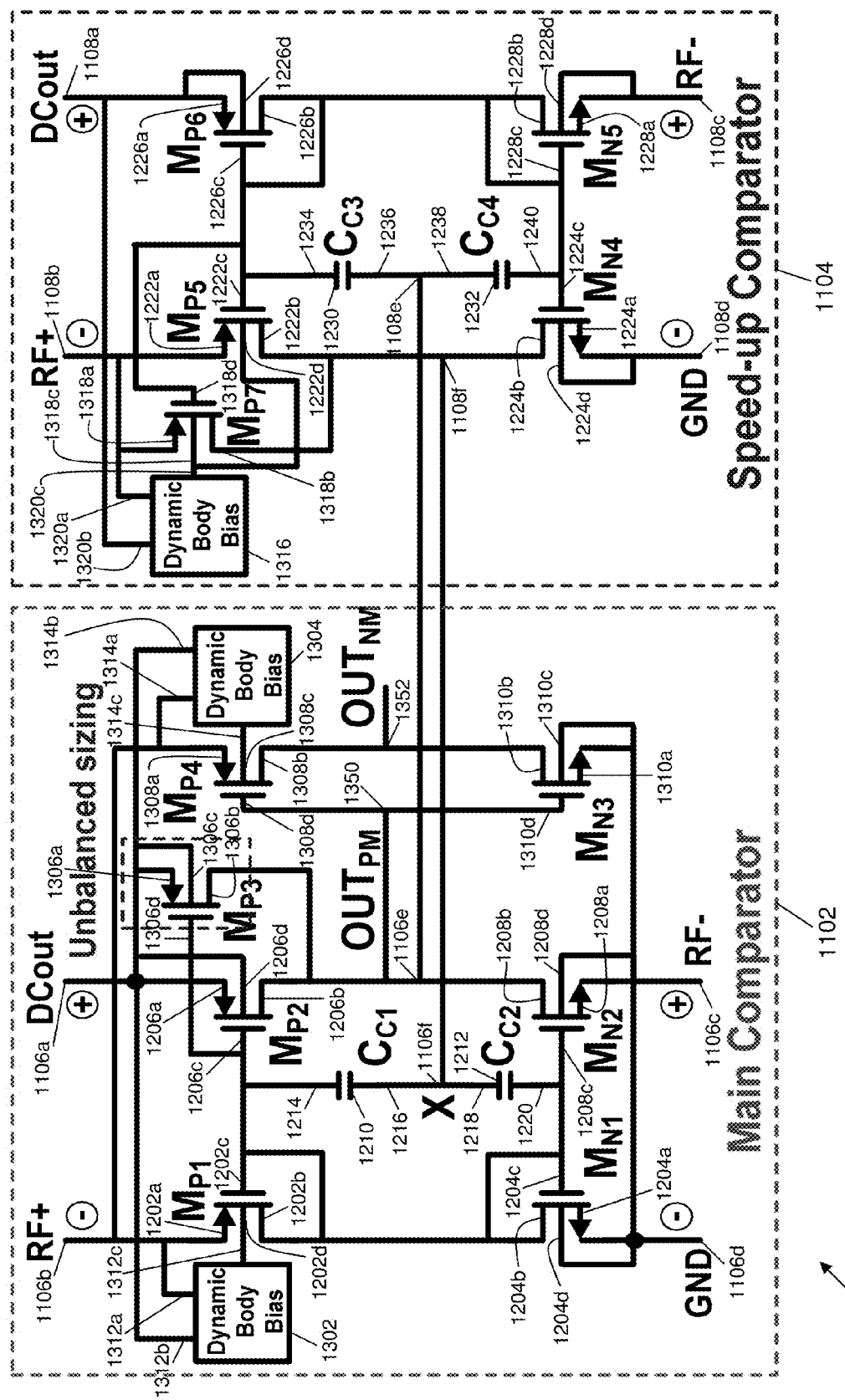
FIG. 13 shows a more detailed schematic diagram of a comparator for a rectifier according to one embodiment.

FIG. 13 shows a more detailed schematic diagram of the comparator 1100. In one embodiment, the main comparator unit 1102 of the comparator 1100 further includes a fifth transistor $M_{P3}$, a sixth transistor $M_{P4}$ and a seventh transistor $M_{N3}$. The main comparator unit 1102 also includes a first dynamic body bias unit 1302 and a second dynamic body bias unit 1304. The first dynamic body bias unit 1302 and the second dynamic body bias unit 1304 may have an identical or a similar circuit arrangement (e.g. circuit arrangement 1000 as shown in FIG. 10) as the dynamic body bias unit 902.

The fifth transistor $M_{P3}$ has a first terminal 1306a, a second terminal 1306b, a third terminal 1306c and a control terminal 1306d. The sixth transistor $M_{P4}$ has a first terminal 1308a, a second terminal 1308b, a third terminal 1308c and a control terminal 1308d. The seventh transistor $M_{N3}$ has a first terminal 1310a, a second terminal 1310b, a third terminal 1310c and a control terminal 1310d. The first dynamic body bias unit 1302 has a first terminal 1312a, a second terminal 1312b and a third terminal 1312c. The second dynamic body bias unit 1304 has a first terminal 1314a, a second terminal 1314b and a third terminal 1314c. Each of the first transistor $M_{P1}$, the second transistor $M_{N1}$, the third transistor $M_{P2}$ and the fourth transistor has a third terminal 1202d, 1204d, 1206d, 1208d.

The first terminal 1312a of the first dynamic body bias unit 1302 is coupled to the first terminal 1202a of the first transistor $M_{P1}$, the first terminal 1314a of the second dynamic body bias unit 1304 and the first terminal 1308a of the sixth transistor $M_{P4}$. The second terminal 1312b of the first dynamic body bias unit 1302 is coupled to the first terminal 1206a of the third transistor $M_{P2}$, the third terminal 1206d of the third transistor $M_{P2}$, the first terminal 1306a of the fifth transistor $M_{P3}$, the third terminal 1306c of the fifth transistor $M_{P2}$ and the second terminal 1314b of the second dynamic body bias unit 1304. The third terminal 1312c of the first dynamic body bias unit 1302 is coupled to the third terminal 1202d of the first transistor $M_{P1}$. The third terminal 1314c of the second dynamic body bias unit 1304 is coupled to the third terminal 1308c of the sixth transistor $M_{P4}$. The second terminal 1306b of the fifth transistor $M_{P3}$ is coupled to the second terminal 1206b of the third transistor $M_{P2}$, the second terminal 1208b of the fourth transistor $M_{N2}$, the control terminal 1308d of the sixth terminal $M_{P4}$ and the control terminal 1310d of the seventh terminal $M_{N3}$. The control terminal 1306d of the fifth transistor $M_{P3}$ is coupled to the control terminal 1202c of the first transistor $M_{P1}$, the second terminal 1202b of the first transistor $M_{P1}$, the control terminal 1206c of the third transistor $M_{P3}$ and the first terminal 1214 of the first capacitor 1210. The second terminal 1308b of the sixth transistor $M_{P4}$ is coupled to the second terminal 1310b of the seventh transistor $M_{N3}$. The first terminal 1312a of the seventh transistor $M_{N3}$ is coupled to the third terminal 1312c of the seventh transistor $M_{N3}$, the third terminal 1204d of the second transistor $M_{N1}$, the first terminal 1204a of the second transistor $M_{N1}$ and the third terminal 1208d of the fourth transistor $M_{N2}$.

In one embodiment, the secondary comparator unit 1104 of the comparator further includes a fifth transistor $M_{P7}$ and a dynamic body bias unit 1316. The dynamic body bias unit 1316 may have an identical or a similar circuit arrangement (e.g. circuit arrangement 1000 as shown in FIG. 10) as the dynamic body bias unit 902. The fifth transistor $M_{P7}$ has a first terminal 1318a, a second terminal 1318b, a third terminal 1318c and a control terminal 1318d. The dynamic body bias unit 1316 has a first terminal 1320a, a second terminal 1320b and a third terminal 1320c. Each of the first transistor $M_{P5}$, the second transistor $M_{N4}$, the third transistor $M_{P6}$ and the fourth transistor $M_{N5}$ has a third terminal 1222d, 1224d, 1226d, 1228d.

The first terminal 1318a of the fifth transistor $M_{P7}$ is coupled to the first terminal 1320a of the dynamic body bias unit 1316 and the first terminal 1222a of the first transistor $M_{P5}$. The second terminal 1318b of the fifth transistor $M_{P7}$ is coupled to the second terminal 1222b of the first transistor $M_{P5}$ and the second terminal 1224b of the second transistor $M_{N4}$. The third terminal 1318c of the fifth transistor $M_{P7}$ is coupled to the third terminal 1320c of the dynamic body bias unit 1316 and the third terminal 1222d of the first transistor $M_5$. The control terminal 1318d of the fifth transistor $M_{P7}$ is coupled to the control terminal 1222c of the first transistor $M_{P5}$, the second terminal 1226b of the third transistor $M_{P6}$, the control terminal 1226c of the third transistor $M_{P6}$ and the first terminal 1234 of the first capacitor 1230. The second terminal 1320b of the dynamic body bias unit 1316 is coupled to the first terminal 1226a of the third transistor $M_{P6}$ and the third terminal 1226d of the third transistor $M_{P6}$. The third terminal 1224d of the second transistor $M_{N4}$ is coupled to the first terminal 1224a of the second transistor $M_{N4}$. The third terminal 1228d of the fourth transistor $M_{N5}$ is coupled to the first terminal 1228a of the fourth transistor MN5.

In one embodiment, the comparator 1100 may have an output terminal 1350 coupled between the control terminal 1308d of the sixth transistor $M_{P4}$ of the main comparator unit 1102 and the control terminal 1310d of the seventh transistor $M_{N3}$ of the main comparator unit 1102. The comparator 1100 may have a further output terminal 1352 coupled between the second terminal 1308b of the sixth transistor $M_{P4}$ of the main comparator unit 1102 and the second terminal 1310b of the seventh transistor $M_{N3}$ of the main comparator unit 1102.

In one embodiment, a voltage DCout (e.g. a DC voltage) may be applied to the first input terminal 1106a of the main comparator unit 1102 and the first input terminal 1108a of the secondary comparator unit 1104. A voltage RF+ may be applied to the second input terminal 1106b of the main comparator unit 1102 and the second input terminal 1108b of the secondary comparator unit 1104. A voltage RF− may be applied to the third input terminal 1106c of the main comparator unit 1102 and the third input terminal 1108c of the secondary comparator unit 1104. The voltage RF+ and the voltage RF− may be a positive voltage value and a negative voltage value of an alternating (AC) voltage. A voltage GND (ground) may be applied to the fourth input terminal 1106d of the main comparator unit 1102 and the fourth input terminal 1108d of the secondary comparator unit 1104.

In one embodiment, the dynamic body bias units 1302, 1304, 1316 may be used to connect the substrate of the transistors $M_{P1}$, $M_{P4}$, $M_{P7}$ respectively in the comparator 1100 to a higher potential between RF+/RF− and DCout in order to avoid the breakdown of the device.

In one embodiment, the first dynamic body bias unit 902 and the second dynamic body bias unit 904 may be used to connect the substrate of $M_{RP1}$ and $M_{RP2}$ in the rectifier 900 to a higher potential between RF+/RF− and DCout in order to avoid the breakdown of the device.

In one embodiment, the first transistor $M_{P1}$, the third transistor $M_{P2}$, the fifth transistor $M_{P3}$, the sixth transistor $M_{P4}$ of the main comparator unit 1102 are p-channel metal oxide semiconductor field effect transistors (PMOS). The second transistor $M_{N1}$, the fourth transistor $M_{N2}$ and the seventh transistor $M_{N3}$ of the main comparator unit 1102 are n-channel metal oxide semiconductor field effect transistors (NMOS). The first terminal 1202a of the first transistor $M_{P1}$, the first terminal 1204a of the second transistor $M_{N1}$, the first terminal 1206a of the third transistor $M_{P2}$, the first terminal 1208a of the fourth transistor $M_{N2}$, the first terminal 1306a of the fifth transistor $M_{P3}$, the first terminal 1308a of the sixth transistor $M_{P4}$ and the first terminal 1310a of the seventh transistor $M_{N3}$ are source terminals. The second terminal 1202b of the first transistor $M_{P1}$, the second terminal 1204b of the second transistor $M_{N1}$, the second terminal 1206b of the third transistor $M_{P2}$, the second terminal 1208b of the fourth transistor $M_{N2}$, the second terminal 1306b of the fifth transistor $M_{P3}$, the second terminal 1308b of the sixth transistor $M_{P4}$ and the second terminal 1310b of the seventh transistor $M_{N3}$ are drain terminals. The third terminal 1202d of the first transistor $M_{N1}$, the third terminal 1204d of the second transistor $M_{N1}$, the third terminal 1206d of the third transistor $M_{P2}$, the third terminal 1208d of the fourth transistor $M_{N2}$, the third terminal 1306c of the fifth transistor $M_{P3}$, the third terminal 1308c of the sixth transistor $M_{P4}$ and the third terminal 1310c of the seventh transistor $M_{N3}$ are body terminals. The control terminal 1202c of the first transistor $M_{P1}$, the control terminal 1204c of the second transistor $M_{N1}$, the control terminal 1206c of the third transistor $M_{P2}$, the control terminal 1208c of the fourth transistor $M_{N2}$, the control terminal 1306d of the fifth transistor $M_{P2}$, the control terminal 1308d of the sixth transistor $M_{N2}$ and the control terminal 1310d of the seventh transistor $M_{N3}$ are gate terminals.

In one embodiment, the first transistor $M_{P5}$, the third transistor $M_{P6}$ and the fifth transistor $M_{P7}$ of the secondary comparator unit 1104 are p-channel metal oxide semiconductor field effect transistors (PMOS). The second transistor $M_{N4}$ and the fourth transistor $M_{P5}$ of the secondary comparator unit 1104 n-channel metal oxide semiconductor field effect transistors (NMOS). The first terminal 1222a of the first transistor $M_{P5}$, the first terminal 1224a of the second transistor $M_{N4}$, the first terminal 1226a of the third transistor $M_{P6}$, the first terminal 1228a of the fourth transistor $M_{P7}$ and the first terminal 1318a of the fifth transistor $M_{P6}$, are source terminals. The second terminal 1222b of the first transistor $M_{P5}$, the second terminal 1224b of the second transistor $M_{N4}$, the second terminal 1226b of the third transistor $M_{P6}$, the second terminal 1228b of the fourth transistor $M_{N5}$ and the second terminal 1318b of the fifth transistor $M_{N4}$, are drain terminals. The third terminal 1222d of the first transistor $M_{P5}$, the third terminal 1224d of the second transistor $M_{N4}$, the third terminal 1226d of the third transistor $M_{P5}$, the third terminal 1228d of the fourth transistor $M_{N5}$ and the third terminal 1318c of the fifth transistor $M_{P7}$, are body terminals. The control terminal 1222c of the first transistor $M_{P5}$, the control terminal 1224c of the second transistor $M_{N4}$, the control terminal 1226c of the third transistor $M_{P6}$, the control terminal 1228c of the fourth transistor $M_{N5}$ and the control terminal 1318d of the fifth transistor $M_{P7}$ are gate terminals.

The first comparator $CC_1$ shown in FIG. 9 may have the configuration of the comparator 1100 as described above. The second comparator $CC_2$ shown in FIG. 9 may also have the configuration of the comparator 1100 as described above.

The comparator arrangement 901 having the first comparator $CC_1$ and the second comparator $CC_2$ may be a self-biased comparator for fast ON-OFF output response. In order to improve the efficiency of the rectifier 900, the conduction time of the active diodes (e.g. first transistor $M_{RP1}$, second transistor $M_{RN1}$, third transistor $M_{RP2}$, fourth transistor $M_{RN2}$) in the rectifier 900 in the positive cycle (when the load is being charged) must be maximized while the reverse conduction time must be minimized.

An operation of the comparator arrangement 901 is described below using only the first comparator $CC_1$. With reference to FIG. 9 and FIG. 13, when the AC voltage RF+ at the second input terminal 1106b of the main comparator unit 1102 of the first comparator $CC_1$ (e.g. the second input terminal 916b of the first comparator $CC_1$) is higher than the DC voltage DCout at the first terminal 1106a of main comparator unit 1102 of the first comparator $CC_1$ (e.g. the first input terminal 916a of the first comparator $CC_1$), the third transistor $M_{P2}$ is turned off while the fourth transistor $M_{N2}$ is turned on. The output voltage at the output terminal 1350 is equal to the AC voltage RF− applied at the third terminal 1106c of the main comparator unit 1102 of the first comparator $CC_1$. The AC voltage RF− may be low in this operation cycle, and thus switching on the first transistor $M_{RP1}$ and the fourth transistor $M_{RN2}$ of the rectifier 900. When the voltage RF+ at the second input terminal 1106b of the main comparator unit 1102 of the first comparator $CC_1$ (e.g. the second input terminal 916b of the first comparator $CC_1$) is lower than the DC voltage DCout at the first terminal 1106a of main comparator unit 1102 of the first comparator $CC_1$ (e.g. the first input terminal 916a of the first comparator $CC_1$), the third transistor $M_{P2}$ is turned on while the fourth transistor $M_{N2}$ is turned off. The output voltage at the output terminal 1350 is equal to DCout. The first transistor $M_{RP1}$ and the fourth transistor $M_{RN2}$ of the rectifier 900 are turned off. An additional PMOS $M_{P3}$ transistor is added to the third transistor $M_{P2}$ for unbalanced sizing to improve the pull-up response so that the reverse conduction time is minimized to reduce the leakage current.

It can be understood by a skilled person that the opposite of the above described operation of the first comparator $CC_1$ applies for the second comparator $CC_2$. This may be due to the cross-coupled connection between the first comparator $CC_1$ and the second comparator $CC_2$. The second input terminal 916b of the first comparator $CC_1$ is coupled to the third input terminal 918c of the second comparator $CC_2$, and the third input terminal 916c of the first comparator $CC_1$ is coupled to the second input terminal 918b of the second comparator $CC_2$. Thus, when the voltage at the second input terminal 916b of the first comparator $CC_1$ is higher than the voltage at the first input terminal 916a of the first comparator $CC_1$, the voltage at the second input terminal 918b of the second comparator $CC_2$ is lower than the voltage at the first input terminal 918a of the second comparator $CC_2$. When the voltage at the second input terminal 916b of the first comparator $CC_1$ is lower than the voltage at the first input terminal 916a of the first comparator $CC_1$, the voltage at the second input terminal 918b of the second comparator $CC_2$ is higher than the voltage at the first input terminal 918a of the second comparator $CC_2$. Therefore, when the first transistor $M_{RP1}$ and the fourth transistor $M_{RN2}$ of the rectifier 900 are switched on, the second transistor $M_{RN2}$ and the third transistor $M_{RP2}$ are switched off and vice versa.

In one embodiment, an input AC voltage to the first comparator $CC_1$ and the second comparator $CC_2$ can be considered as a differential voltage (RF+−RF−). The output voltage can be considered as DCout—GND. There may be a first operation cycle (e.g. positive cycle) and a second operation cycle (e.g. negative cycle). During the positive cycle, RF− is equal to GND. During the negative cycle, RF+ is equal to GND.

In one embodiment, the first comparator $CC_1$ is configured to compare a first voltage applied to the first input terminal 916a and a second voltage applied to the second input terminal 916b during the positive cycle. The second comparator $CC_2$ is configured to compare a first voltage applied to the first input terminal 918a and a second voltage applied to the second input terminal 918b during the negative cycle.

During positive cycle, when the second voltage is greater than the first voltage, the first comparator $CC_1$ is configured to output a first voltage signal (e.g. a low voltage signal) at the first output terminal 916e and a second voltage signal (e.g. a high voltage signal) at the second output terminal 916f. During negative cycle, when the second voltage is greater than the first voltage, the second comparator $CC_2$ is configured to output a first voltage signal (e.g. a low voltage signal) at the first output terminal 918e of the second comparator $CC_2$ and a second voltage signal (e.g. a high voltage signal) at the second output terminal 918f of the second comparator $CC_2$.

During positive cycle, when the second voltage is smaller than the first voltage, the first comparator $CC_1$ is configured to output a second voltage signal (e.g. a high voltage signal) at the first output terminal and a first voltage signal (e.g. a low voltage signal) at the second output terminal. During negative cycle, when the second voltage is smaller than the first voltage, the second comparator $CC_2$ is configured to output a second voltage signal (e.g. a high voltage signal) at the first output terminal 918e of the second comparator $CC_2$ and a first voltage signal (e.g. a low voltage signal) at the second output terminal 918f of the second comparator $CC_2$.

In order to speed up the output transient response of the comparator 1100 (e.g. the first comparator $CC_1$ and the second comparator $CC_2$), a small speed-up comparator (e.g. the secondary comparator unit 1104) is connected in a capacitively cross-coupled latched configuration to the main comparator unit 1102 of the first comparator $CC_1$ and the second comparator $CC_2$ respectively. A similar 4-input common-gate topology can be used with the inputs interchanged compared to the main comparator 1102 to enable this technique. When the voltage RF+ at the second input terminal 1108b of the secondary comparator unit 1104 is higher than the DC voltage DCout at the first input terminal 1108a of the secondary comparator unit 1104, the first transistor $M_{P5}$ will turn on while the second transistor $M_{N4}$ is turned off, which will result in an output at node X to be high. This can help the main comparator unit 1102 to turn on the fourth transistor $M_{N2}$ harder during this operation cycle. A faster response in this cycle will increase the conduction time in the positive cycle so that more current flows into the output load. Likewise, when the voltage RF+ at the second input terminal 1108b of the secondary comparator unit 1104 is lower than the DC voltage DCout at the first input terminal 1108a of the secondary comparator unit 1104, the second transistor $M_{N4}$ will turn on while the first transistor $M_{P5}$ is turned off. The node X may be shorted to ground, which can help the main comparator unit 1102 to turn on the third transistor $M_{P2}$ quicker, leading to a faster pull-up of the voltage at the output terminal 1350 to DCout. The negative conduction time may be minimized to reduce the reverse leakage current and consequently, improve the power conversion efficiency (PCE).

In one embodiment, the comparator 1100 (i.e. the main comparator unit 1102 and the secondary comparator unit 1104) may have a common-gate configuration. The main comparator unit 1102 and the secondary comparator unit 1104 may be connected in a parallel way in a latched configuration to speed up the overall operation. The secondary comparator unit 1104 may act as a parallel comparator to aid in achieving a faster output response. The comparator 1100 may consume dynamic power (i.e. only turns-on when the input signal is present), thus resulting in a lower average power consumption.

Figure 14A:
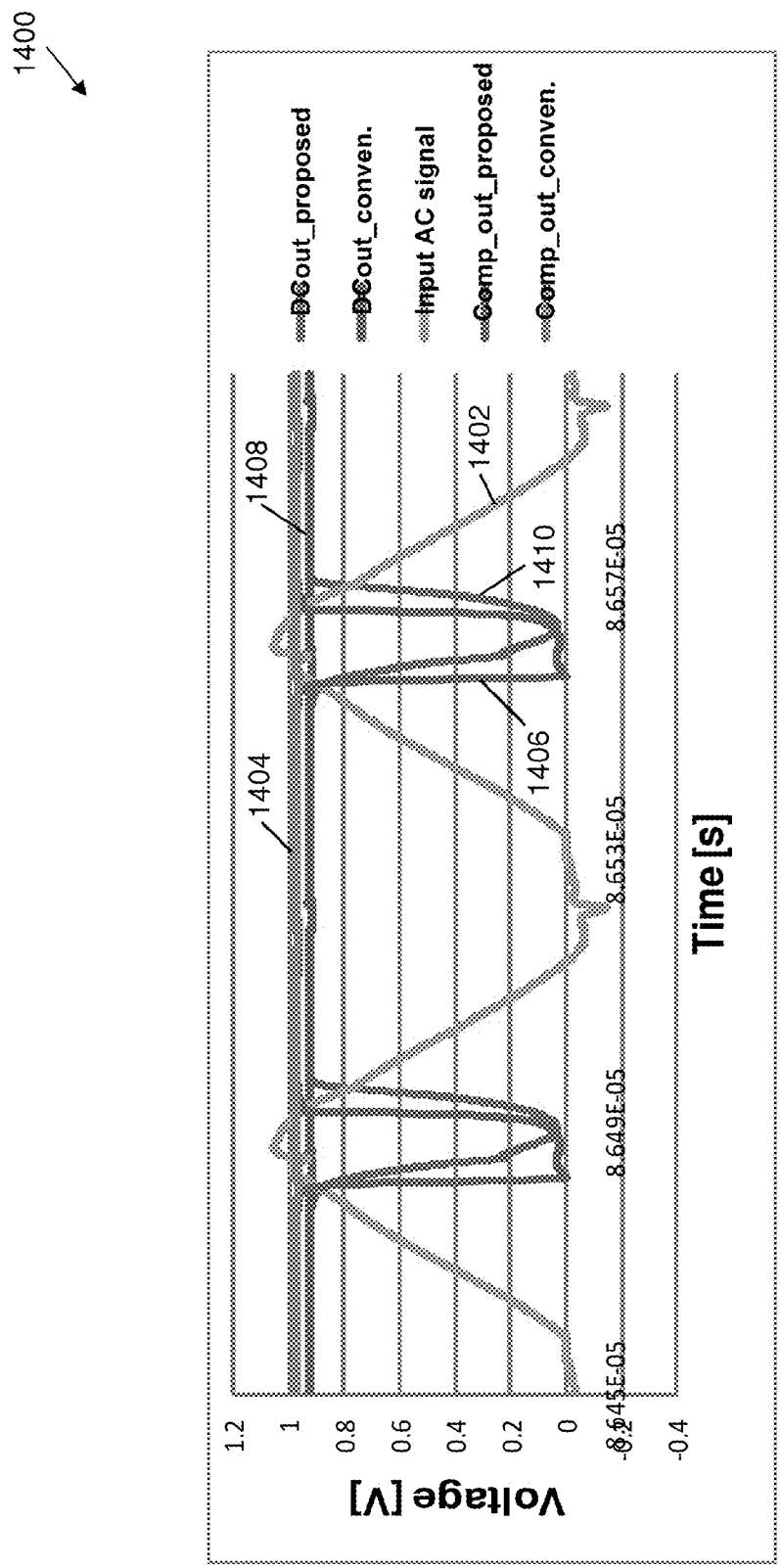
FIG. 14a shows voltage response of an input and an output of a comparator for a rectifier according to one embodiment and of the conventional comparator.

FIG. 14 shows a transient simulation plot of the comparator 1100 and a conventional comparator without the secondary comparator unit 1104. FIG. 14a shows voltage response of the input and output of the comparator 1100 and of the conventional comparator. FIG. 14a shows a graph 1400 of voltage plotted against time. Graph 1400 shows a plot 1402 of an input AC signal, a plot 1404 of the DCout voltage of the comparator 1100, and a plot 1406 of an output voltage of the comparator 1100. Graph 1400 also shows a plot 1408 of the DCout voltage of the conventional comparator and a plot 1410 of an output voltage of the conventional comparator.

Figure 14B:
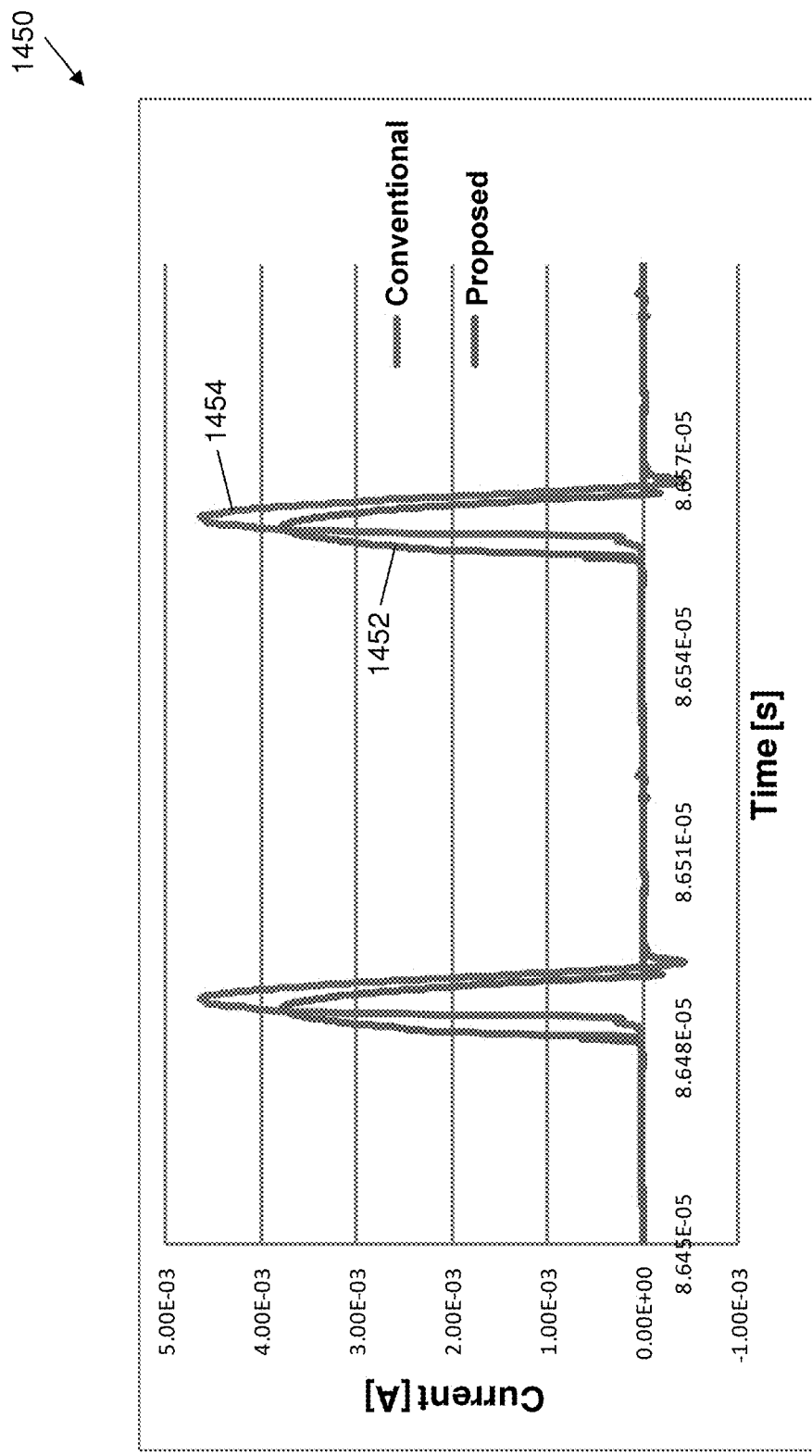
FIG. 14b shows current flow of a comparator for a rectifier according to one embodiment and of the conventional comparator.

FIG. 14b shows the current flow of the comparator 1100 and of the conventional comparator. FIG. 14b shows a graph 1450 of current plotted against time. Graph 1450 shows a plot 1452 of the current flow of the comparator 1100 and a plot 1454 of the current flow of the conventional comparator.

It can be observed from graph 1400 and graph 1406 that due to the added cross-coupled latched comparator (e.g. secondary comparator unit 1104), the comparator 1100 has a faster output response. Thus, the forward current flowing into the load can be increased. The reverse leakage current can be minimized and the PCE of the rectifier 900 can be improved from 75% to 85%.

Therefore, the rectifier 900 with 4-input cross-coupled latched comparator 1100 can provide faster output response and efficiency improvement.

Figure 15:
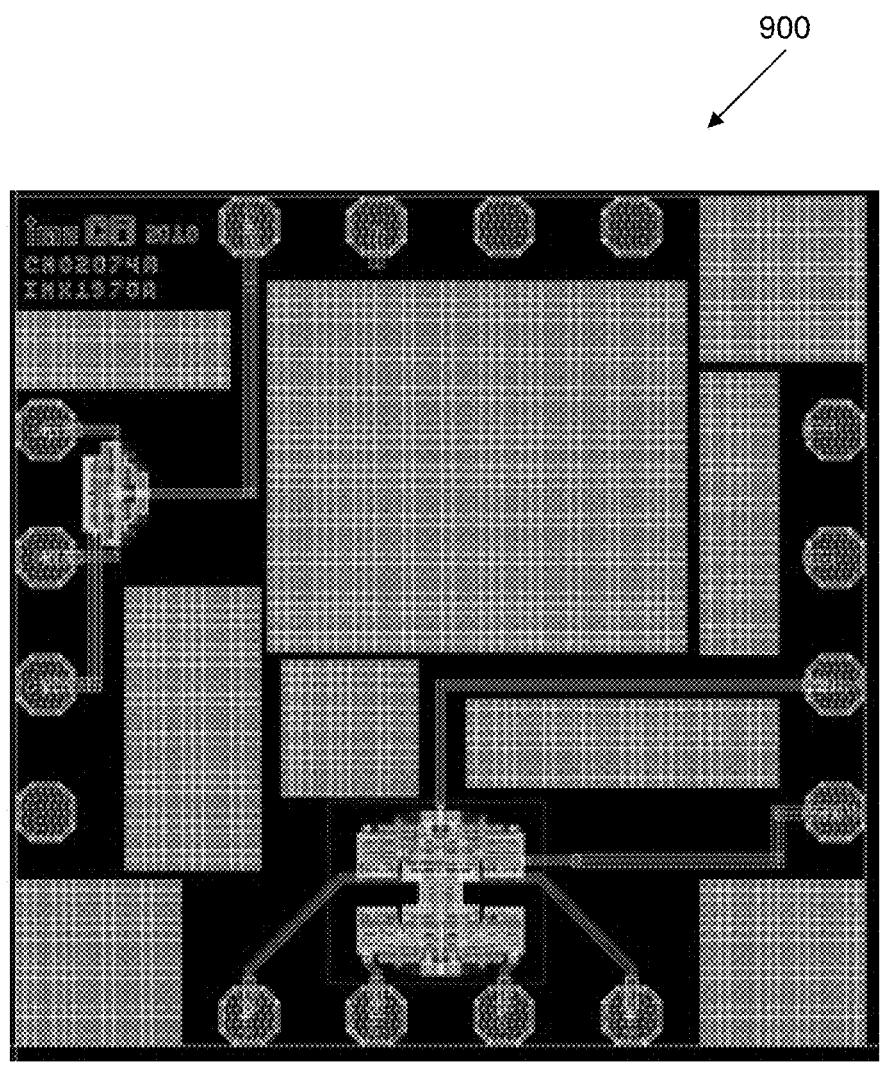
FIG. 15 shows a chip layout of a rectifier according to one embodiment.
Figure 16:
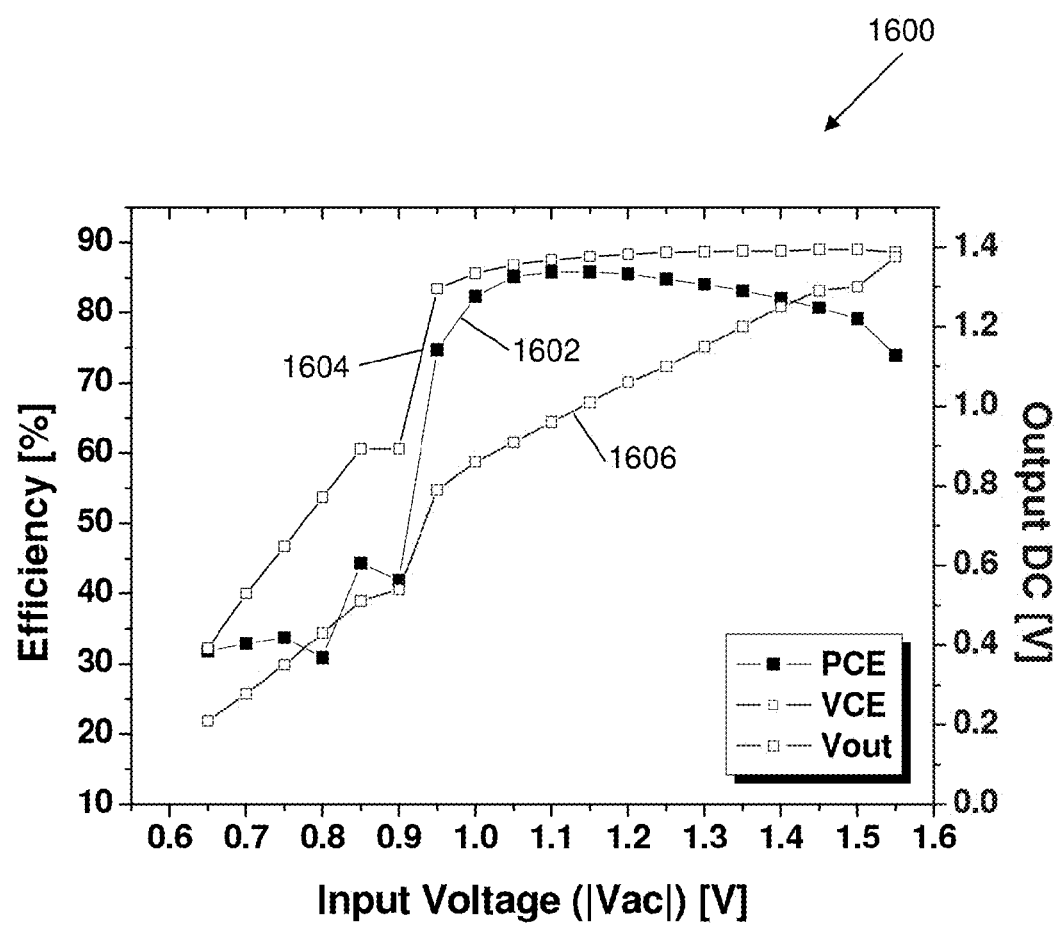
FIG. 16 shows a graph of results of simulations carried out for a rectifier according to one embodiment.

The rectifier 900 can be fabricated in one-poly six-metal (1P 6M) 0.18-μm CMOS process. The chip layout of the rectifier 900 is shown in FIG. 15, where the total chip area of the core is 0.009 mm². Simulations can be carried out at 13.56 MHz with an output load of 1 kΩ and 3 nF. FIG. 16 shows a graph 1600 of the results of the simulations. Graph 1600 shows a plot 1602 of the simulated power conversion efficiency (PCE) plotted against an input AC voltage. Graph 1600 shows a plot 1604 of the simulated voltage conversion efficiency (VCE) plotted against the input AC voltage. Graph 1600 shows a plot 1606 of rectified output DC voltage plotted against an input AC voltage.

It can be observed from graph 1600 that a peak PCE of 85% is achieved at a small input signal voltage of 1.1 V. The operation of the self-biased comparator ($CC_1$ and $CC_2$) can start at around 0.95 V input and output DC voltage which results in a sudden increase in both the PCE and VCE at this operating point. The output DC voltage increases quite linearly according to the increase in the input voltage.

Figure 17:
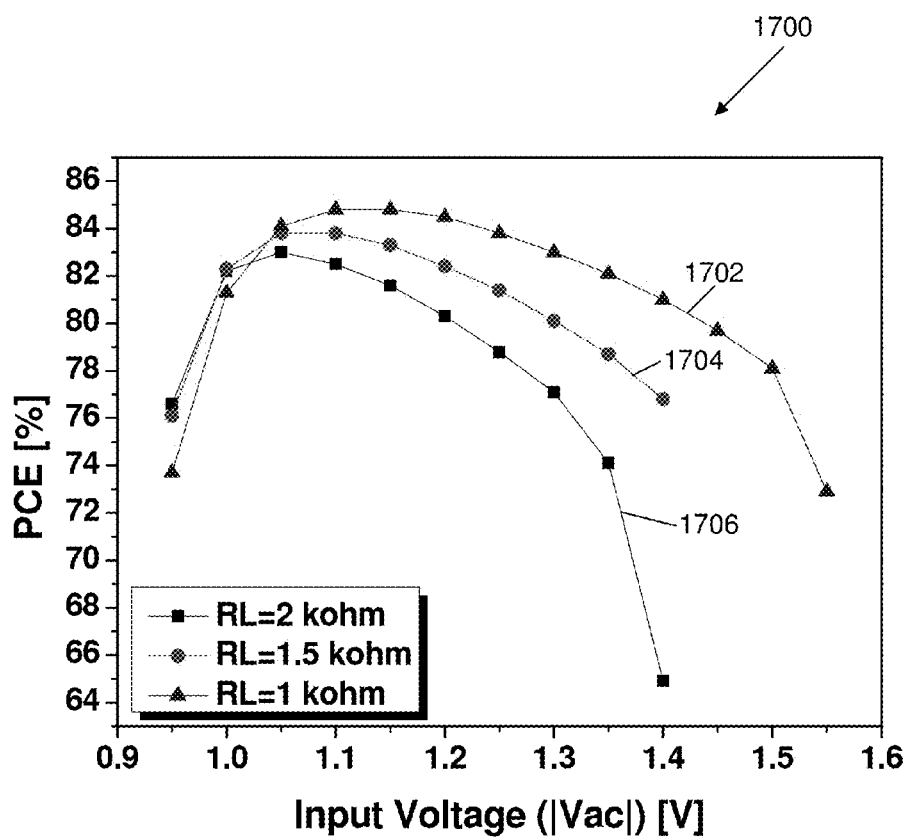
FIG. 17 shows a graph illustrating simulated output load dependence of power conversion efficiency (PCE) for a rectifier according to one embodiment.

FIG. 17 shows a graph 1700 illustrating simulated output load dependence of power conversion efficiency (PCE). The simulation can be carried out at 13.56 MHz input frequency. Graph 1700 shows a plot 1702 of power conversion efficiency plotted against an input AC voltage when the output load is 1 kΩ. Graph 1700 shows a plot 1704 of power conversion efficiency plotted against the input voltage when the output load is 1.5 kΩ. Graph 1700 shows a plot 1706 of power conversion efficiency plotted against the input voltage when the output load is 2 kΩ.

It can be observed from graph 1700 that when the output load resistance is increased, the PCE curve shifts to a smaller input voltage region. Thus, the maximum PCE can be obtained at smaller input signal. The difference in the peak PCE depending on the variation of the load resistance is because the optimal rectifier transistor size is different according to the output loading condition.

The simulated rectifier 900 as shown in FIG. 15 can obtain a maximum power conversion efficiency of 85% at a 13.56 MHz frequency and at a low input signal voltage of 1.1 V. The simulated rectifier 900 can also obtain a maximum power conversion efficiency of 88% at a 1 MHz frequency and at a low input signal voltage of 1 V. As compared to conventional low-frequency comparator-based CMOS rectifiers, the rectifier shows better performance.

Figure 18A:
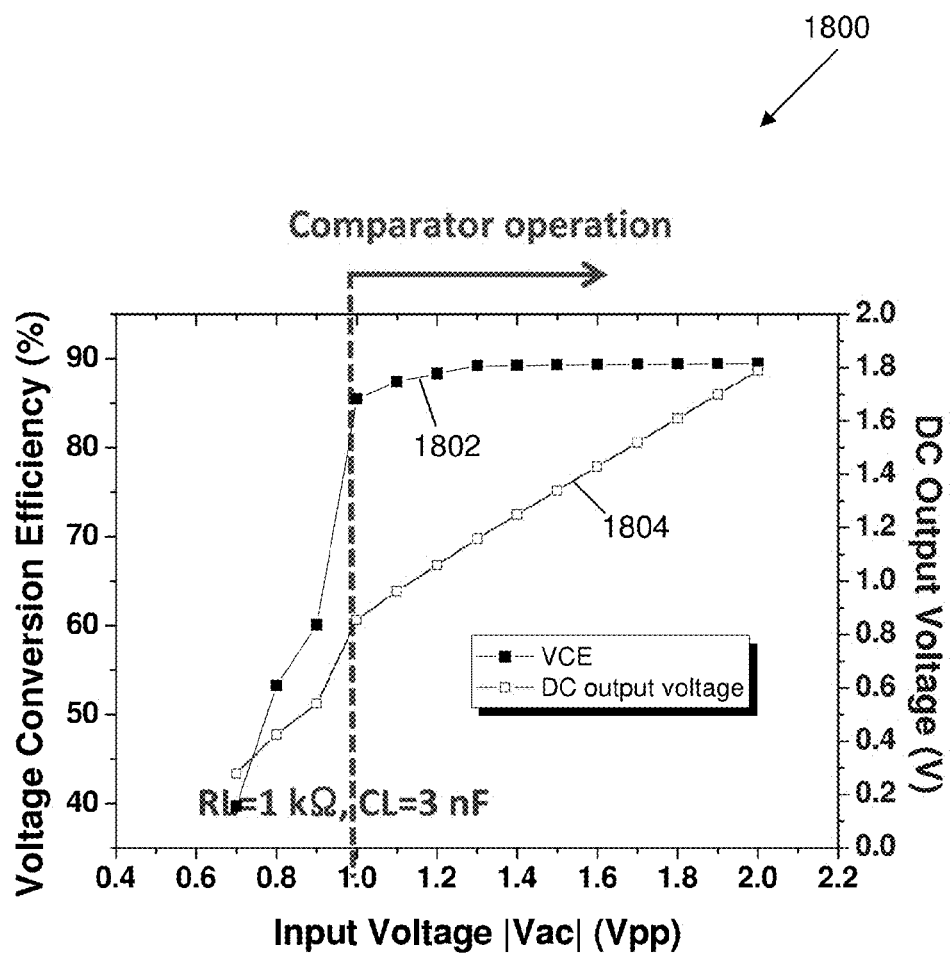
FIG. 18a shows a graph of simulated results of a rectifier according to one embodiment.

FIG. 18a shows a graph 1800 of simulated results of the rectifier 900. The simulations can be carried out with an output load of 1 kΩ and 3 nF. Graph 1800 shows a plot 1802 of voltage conversion efficiency plotted against an input AC voltage. Graph 1800 also shows a plot 1804 of rectified DC output voltage plotted against an input AC voltage. It can be observed that a maximum voltage conversion efficiency of about 90% is obtained at an input voltage of about 1.3 V. The voltage conversion efficiency of about 90% can be maintained over an input voltage ranging from about 1.3 V to about 2.0 V. The comparator operation starts at about 1 V. The DC output voltage increases linearly according to the increase in the input voltage from 1 V onwards.

Figure 18B:
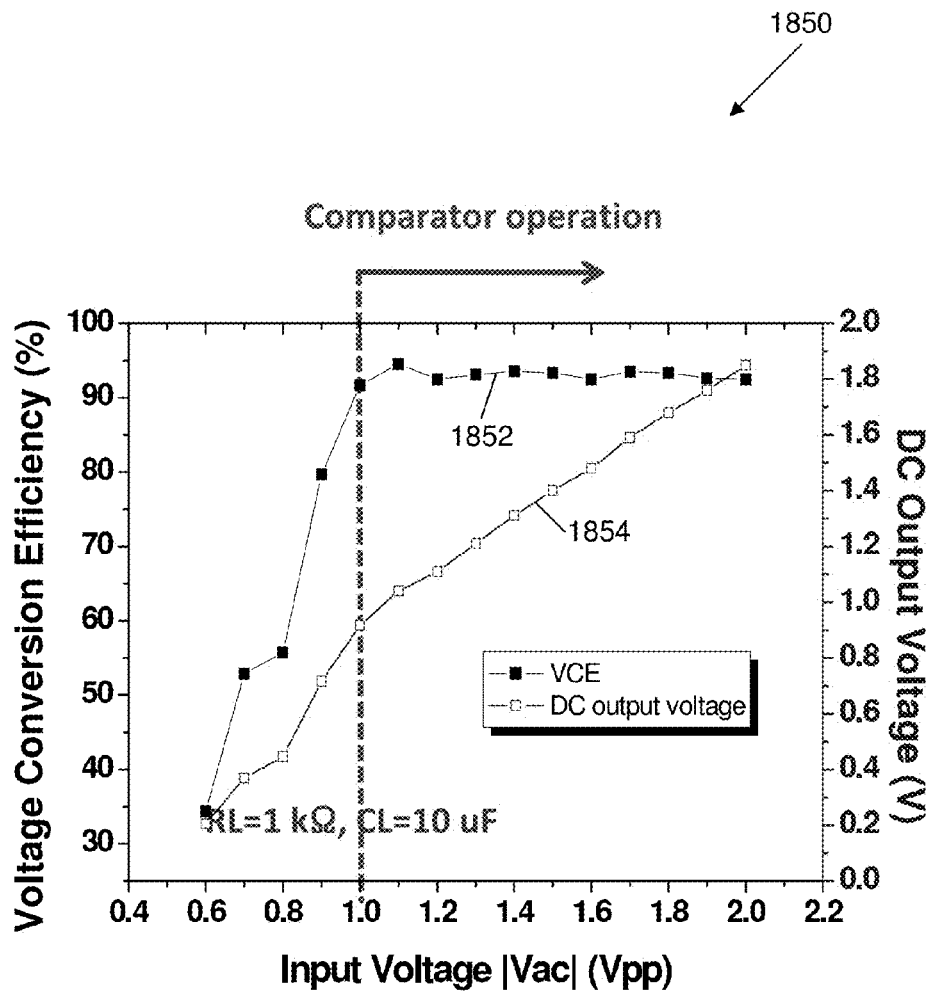
FIG. 18b shows a graph of measured results of a rectifier according to one embodiment.

FIG. 18b shows a graph 1850 of measured results of the rectifier 900. The simulations can be carried out with an output load of 1 kΩ and 10 μF. Graph 1850 shows a plot 1852 of voltage conversion efficiency plotted against an input AC voltage. Graph 1850 also shows a plot 1854 of rectified DC output voltage plotted against an input AC voltage. It can be observed that a maximum voltage conversion efficiency of about 94.5% is measured. The voltage conversion efficiency above 90% can be maintained over an input voltage ranging from about 1.3 V to about 2.0 V. The maximum voltage conversion efficiency of about 94.5% can be obtained at an input voltage of about 1.1 V. The comparator operation starts at about 1 V. The DC output voltage increases linearly according to the increase in the input voltage from 1 V onwards.

Thus, the rectifier 900 can provide over 90% voltage conversion efficiency for small input voltage and such voltage conversion frequency can be maintained for a reasonable input signal range.

In one embodiment, the rectifier 900 may be a highly efficient rectifier for wireless power transfer in biomedical applications which can be implemented using 0.18 μm CMOS process. The rectifier 900 may include active NMOS and PMOS diodes with cross-coupled latched comparators to maximize the power conversion efficiency. An 85% of maximum power conversion efficiency may be achieved at low input signal of 1.1 V at 13.56 MHz operating frequency due to the topology of the rectifier 900.

Regulator

Figure 19:
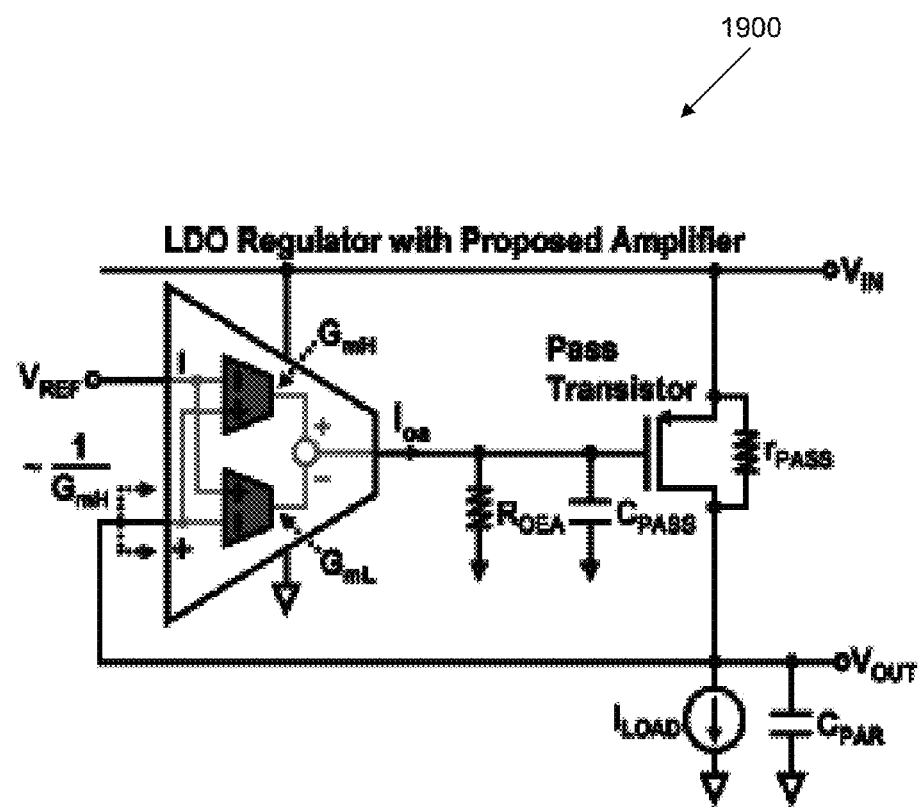
FIG. 19 shows a conventional capacitor-less low dropout (LDO) regulator.

For implantable devices, both power efficiency and off-chip components minimization are crucial. Existing capacitor-less low dropout (LDO) regulator generally has a low loop gain which limits the stability under low output power condition. FIG. 19 shows a conventional capacitor-less LDO regulator 1900. The regulator 1900 may have a loop gain of $6g_m r_o$.

Figure 20:
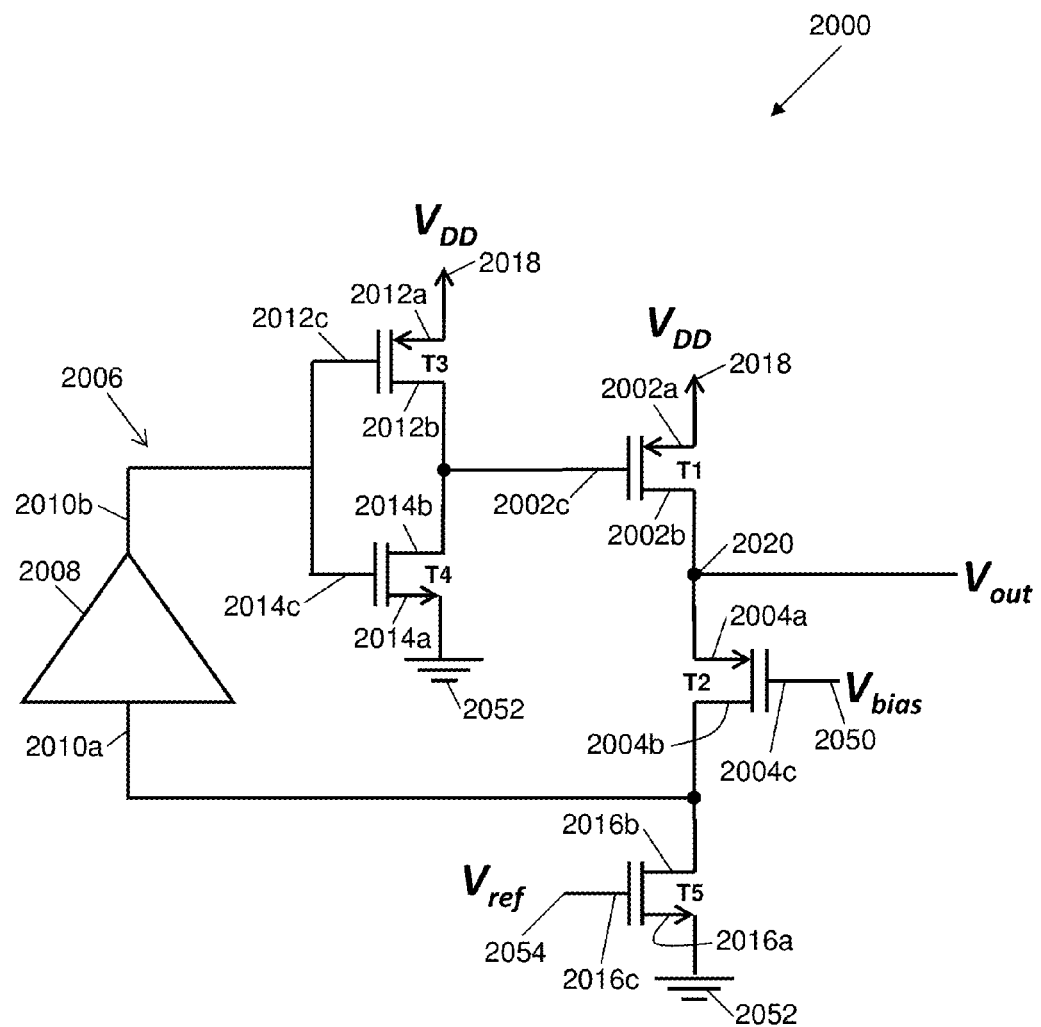
FIG. 20 shows a schematic diagram of a regulator according to one embodiment.

FIG. 20 shows a schematic diagram of a regulator 2000 according to one embodiment. The regulator 2000 includes a first transistor T1 and a second transistor T2. The first transistor T1 has a first terminal 2002a, a second terminal 2002b and a control terminal 2002c. The second transistor T2 has a first terminal 2004a, a second terminal 2004b and a control terminal 2004c. The second terminal 2002b of the first transistor T1 is coupled to the first terminal 2004a of the second transistor T2. The control terminal 2004c of the second transistor T2 is coupled to a first voltage reference (e.g. $V_{bias}$) 2050.

The regulator 2000 includes a feedback arrangement 2006 coupled between the control terminal 2002c of the first transistor T1 and the second terminal 2004b of the second transistor T2. The feedback arrangement 2006 includes a current comparator 2008, a third transistor T3 and a fourth transistor T4. The current comparator 2008 has an input terminal 2010a and an output terminal 2010b. The third transistor T3 has a first terminal 2012a, a second terminal 2012b and a control terminal 2012c. The fourth transistor T4 has a first terminal 2014a, a second terminal 2014b and a control terminal 2014c.

The input terminal 2010a of the current comparator 2008 is coupled to the second terminal 2004b of the second transistor T2. The output terminal 2010b of the current comparator 2008 is coupled to the control terminal 2012c of the third transistor T3 and the control terminal 2014c of the fourth transistor T4. The second terminal 2012b of the third transistor T3 is coupled to the second terminal 2014b of the fourth transistor T4 and the control terminal 2002c of the first transistor T1. The first terminal 2014a of the fourth transistor T4 is coupled to a second voltage reference 2052. The second voltage reference 2052 may be ground.

The regulator 2000 includes a fifth transistor T5 having a first terminal 2016a, a second terminal 2016b and a control terminal 2016c. The first terminal 2016a of the fifth transistor T5 is coupled to the second voltage reference 2052. The second terminal 2016b of the fifth transistor T5 is coupled to the second terminal 2004b of the second transistor T2. The control terminal 2016c of the fifth transistor T5 is coupled to a third voltage reference (e.g. $V_{ref}$) 2054.

In one embodiment, the regulator 2000 has an input terminal 2018 coupled to the first terminal 2002a of the first transistor T1 and the first terminal 2012a of the third transistor T3. A voltage $V_{DD}$ may be applied to the input terminal 2018. The regulator 2000 has an output terminal 2020 coupled between the second terminal 2002b of the first transistor T1 and the first terminal 2004a of the second transistor T2.

In one embodiment, the first transistor T1, the second transistor T2 and the third transistor T3 may be p-channel metal oxide semiconductor field effect transistors (PMOS). The fourth transistor T4 and the fifth transistor T5 may be n-channel metal oxide semiconductor field effect transistors (NMOS). The first terminals of the transistors T1-T5 may be source terminals. The second terminals of the transistors T1-T5 may be drain terminals. The control terminals of the transistors T1-T5 may be gate terminals.

The regulator 2000 may utilize a flipped voltage follower (FVF) structure to achieve low output impedance. Hence, it can be stable under the absence of off-chip capacitor. Such structure has limitation in its loop gain which in turn limits the load regulation performance of the LDO. In order to improve the loop gain, a 2-stage current mode feedback mechanism is applied. The output voltage variation is converted to current by the FVF structure and is compared with a current reference using the current comparator 2008. The output of the current comparator 2008 may control the switching of a thick-gate charge pump (e.g. the third transistor T3 and the fourth transistor T4) to charge/discharge the gate voltage of the output power MOSFET (e.g. the first transistor T1).

The two stage current mode feedback mechanism can improve the loop gain of the regulator 2000 to 50 dB. The loop gain of the regulator 2000 can be represented by $(g_m r_o)^2$. Compared to the conventional regulator 1900, the regulator 2000 has lower output impedance because of the higher loop gain. As the input impedance of the current comparator 2008 is low, it does not introduce additional low frequency poles to the regulator 2000. As a result, the LDO regulator 2000 can remain stable without an off-chip capacitor. The stability performance of the regulator 2000 under low load condition can be improved. The capacitor-less LDO regulator 2000 with current mode feedback mechanism can achieve high loop-gain and better stability under low output power conditions.

The line regulation of the regulator 2000 may be improved by using a better designed current comparator which is not sensitive to supply. Nonlinear circuits can be applied in the regulator 200 to reduce the power consumption.

Figure 21:
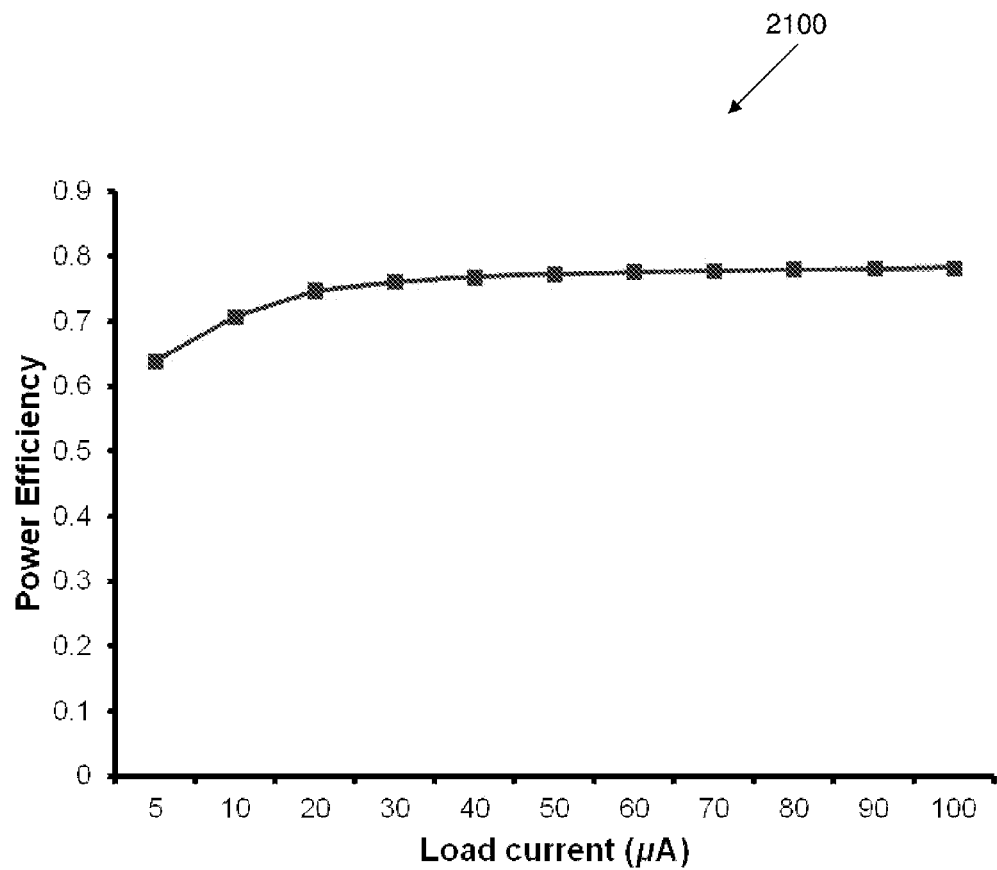
FIG. 21 shows a graph of power efficiency plotted against load current for a regulator according to one embodiment.

FIG. 21 shows a graph 2100 of power efficiency plotted against load current for the regulator 2000. It can be observed that the regulator 2000 can achieve more than 70% power efficiency under 10 μA low load condition. The regulator 2000 can achieve high power efficiency (70.7%) for low power application with power consumption of 1.43 uW.

Figure 22:
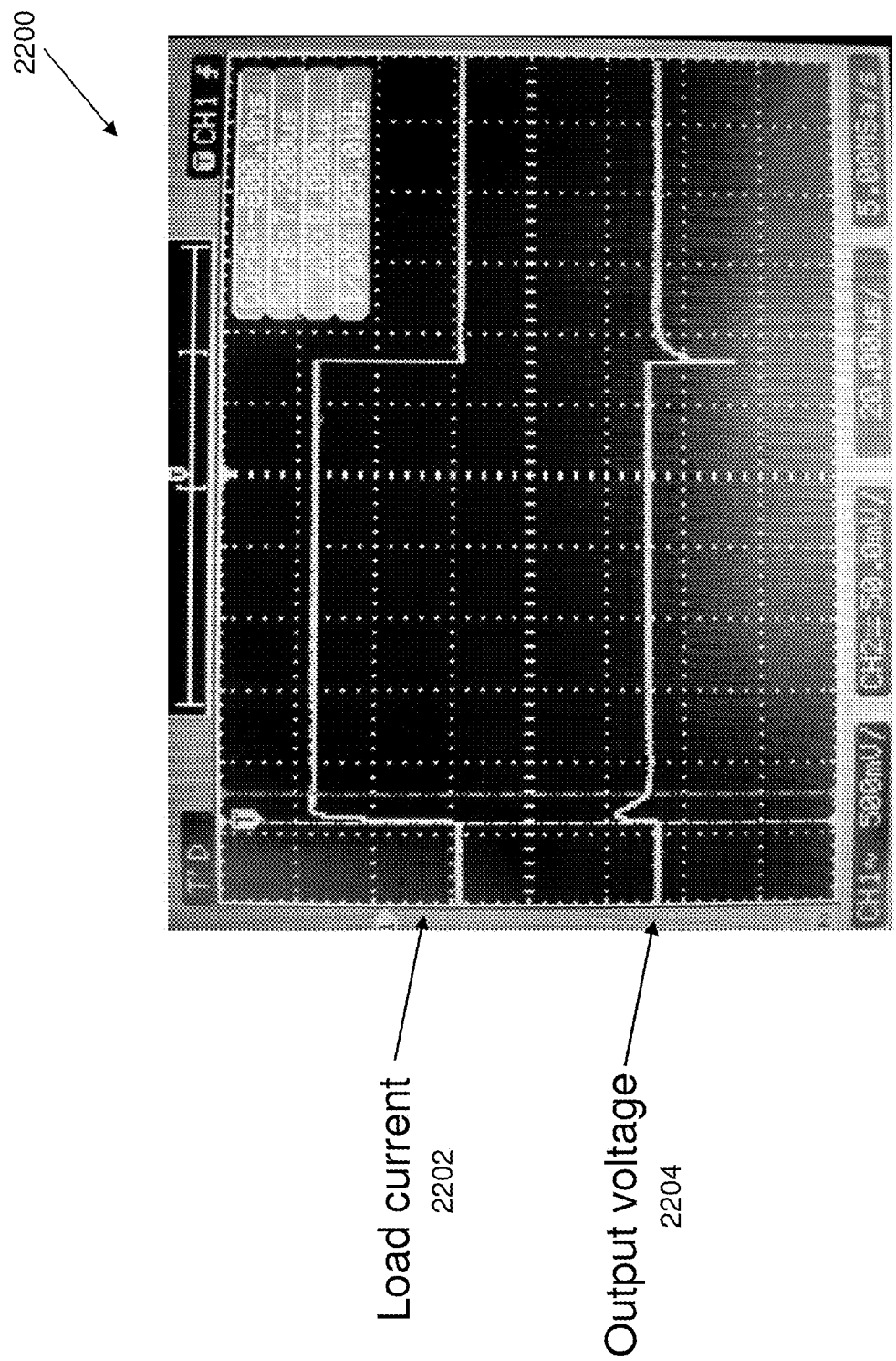
FIG. 22 shows a graph of a transient response of a regulator according to one embodiment.
Figure 23:
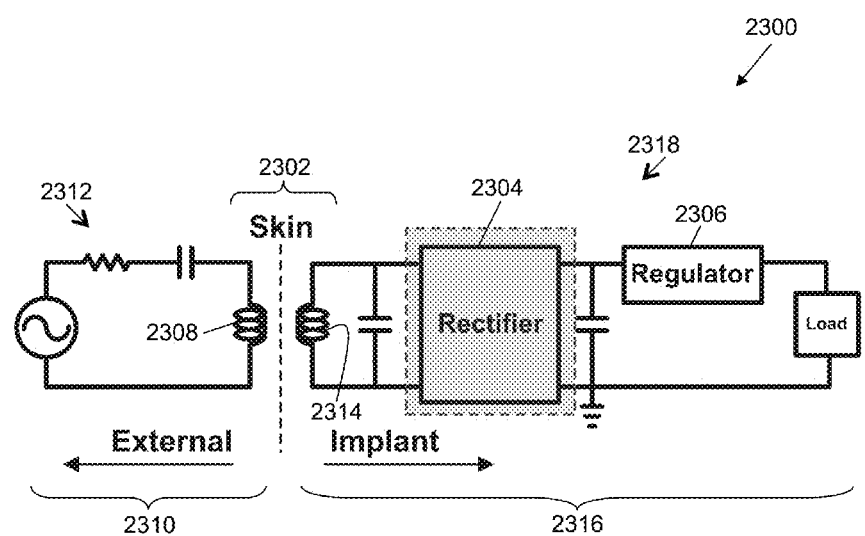
FIG. 23 shows a conventional wireless power transfer system.

FIG. 22 shows a graph 2200 of a transient response of the regulator 2000. Graph 2200 shows a plot 2202 of a load current. The load current may vary between 3 μA and 100 μA. Graph 2200 shows a plot 2204 of an output voltage. It can be observed that a glitch occurs in the output voltage when the load current changes.

Power Transfer Device

Referring back to FIG. 24, the power transfer device 2400 may include the circuit arrangement 100 (circuit arrangement 2402), the rectifier 900 (rectifier 2404) and the regulator 2000 (rectifier 2406) as described above. In the power transfer device 2400, the voltage source 906 of the rectifier 900 may be a representation of the circuit arrangement 100. In other words, the voltage supplied by the voltage source 906 may be an output voltage of the circuit arrangement 100. Therefore, the first terminal 932a and the second terminal 932b of the voltage source 906 may be the first input terminal and the second input terminal of the rectifier 900 respectively. The resistor $R_L$ of the rectifier 900 may be a representation of a load of the rectifier 900. Therefore, the first terminal 936a and the second terminal 936b of the resistor $R_L$ may be a first output terminal and a second output terminal of the rectifier 900 respectively.

The rectifier 900 is coupled between the circuit arrangement 100 and the regulator 2000. The rectifier 900 is coupled to the circuit arrangement 100 such that the first input terminal 932a of the rectifier 900 is coupled to the first terminal 120 of the inductor 112 of the load transformation unit 110 of the circuit arrangement 100 and the second input terminal 932b of the rectifier 900 is coupled to the second terminal 122 of the inductor 112 of the load transformation unit 110 of the circuit arrangement 100. The regulator 2000 is coupled to the rectifier 900 such that the first output terminal 936a of the rectifier 900 is coupled to the input terminal 2018 of the regulator 2000.

The power transfer device 2400 may include a power amplifier 2408 in an external side 2450. The power transfer device 2400 may include a comparator 2410, and a series arrangement 2412 of a first resistor R1 and a second resistor R2 in an implanted side 2452 of the power transfer device 2400. The power amplifier 2408 may have an input terminal 2414a, an output terminal 2414b, a first control terminal 2414c and a second control terminal 2414d. The comparator 2410 may have a first input terminal 2416a, a second input terminal 2416b and an output terminal 2416c. The power transfer device 2400 may include an input terminal 2418, a first output terminal 2420 and a second output terminal 2422.

The input terminal 2418 of the power transfer device 2400 may be coupled to input terminal 2414a of the power amplifier 2408. The output terminal 2414b of the power amplifier 2408 may be coupled to the first terminal 134 of the inductor 104 of the circuit arrangement 100. The first control terminal 2414c of the power amplifier 2408 may be coupled to a voltage reference 2424. The second control terminal 2414d of the power amplifier 2408 may be coupled to the second terminal 136 of the inductor 104 of the circuit arrangement 100. The series arrangement 2412 may be coupled between a first line 2426 between the rectifier 900 and the regulator 2000 and a second line 2428 between the rectifier 900 and the regulator 2000. The first input terminal 2416a of the comparator 2410 may be coupled between the first resistor R1 and the second resistor R2. A reference voltage $V_{ref}$ may be applied to the second input terminal 2416b of the comparator 2410. An output signal 2430 may be transmitted from the output terminal 2416c of the comparator 2410 to the power amplifier 2408. An output voltage $V_{out}$ may be measured between the first output terminal 2420 and the second output terminal 2422.

In one embodiment, the power transfer device 2400 may be a high-efficiency wireless powering link with large power dynamic range. An optimal resonant load transformation is used in the circuit arrangement 100 to overcome the loading effect on the resonant inductive coupling caused by the rectifier 900 and thus greatly boost the efficiency especially in high power cases. The efficiency of the circuit arrangement 100 (inductive coupling) can be improved to about 80% for high power case as compared to 40% of conventional inductive coupling arrangements. The circuit arrangement 100 is compact, easy for integration and tuning, and biocompatible.

The rectifier 900 with a cross-coupled latched comparator to maximize the forward current and minimize the reverse leakage current, and an output capacitor-less LDO regulator 2000 with high loop-gain current mode feedback are used to improve the efficiency and keep stability in low power cases. A reduction in reverse leakage of the rectifier 900 and a high loop-gain current mode feedback of the regulator 2000 can keep the regulator 2000 stable without an output capacitor. The reverse current leakage of the rectifier 900 can be minimized to improve the efficiency to about 85% for low power case as compared to 70% for conventional rectifiers. An efficiency of about 70% can be achieved for the regulator 2000 for low power case as compared to 60% for conventional regulators. The regulator 2000 can have higher loop gain and lower output impedance. Thus, the regulator 2000 can be more stable.

More than 40% of the overall link efficiency can be achieved for the power transfer device 2400 over the power range from micro watt to watt level. In comparison, conventional designs may cause performance degradation, added complexity, or difficulty for integration and tuning to realize high efficiency (>40%) and large power dynamic range (1 μW~1 W).

The power transfer device 2400 is compact, easy for tuning, integration and mass production, as well as biocompatible due to no incorporation of ferromagnetic core and no high resonant current induced. The power transfer device 2400 can be robust for variations of coupling and load impedance.

The power transfer device 2400 can be applicable to biomedical electronics, near field communication (NFC), RFID, contactless power charging and other potential industrial applications where wireless power transfer is needed.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

What is claimed is:

1. A power transfer device, comprising:
a circuit arrangement comprising:
a primary side having a primary coil;
a secondary side having a secondary coil inductively coupled to the primary coil and a load transformation unit;
wherein the load transformation unit comprises an inductor and a capacitor;
wherein the secondary coil, the inductor and the capacitor each comprise a first terminal and a second terminal;
wherein the first terminal of the secondary coil is coupled to the first terminal of the capacitor, the second terminal of the capacitor is coupled to the first terminal of the inductor, and the second terminal of the inductor is coupled to the second terminal of the secondary coil.

2. The power transfer device of claim 1, wherein an optimal resonant load of the load transformation unit is represented by $$\frac{\omega L_2 \sqrt{1 + k^2 Q_1 Q_2}}{Q_2} - j\omega L_2$$

whereby $\omega$ is a power carrier frequency, k is a coupling coefficient between the primary coil and the secondary coil, $L_2$ is an inductance of the secondary coil, $Q_1$ is a quality factor of the primary coil and $Q_2$ is a quality factor of the secondary coil.

3. The power transfer device of claim 1, further comprising:
a rectifier comprising:
a first transistor, a second transistor, a third transistor and a fourth transistor each having a first terminal, a second terminal and a control terminal;
a first comparator and a second comparator each having a first input terminal, a second input terminal, a third input terminal, a fourth input terminal, a first output terminal and a second output terminal;
wherein the first input terminal of the first comparator is coupled to the first input terminal of the second comparator, the second input terminal of the first comparator is coupled to the third input terminal of the second comparator, the third input terminal of the first comparator is coupled to the second input terminal of the second comparator, and the fourth input terminal of the first comparator is coupled to the fourth input terminal of the second comparator;
wherein the first terminal of the first transistor is coupled to the first terminal of the second transistor, the second terminal of the first transistor is coupled to the second terminal of the third transistor, the second terminal of the second transistor is coupled to the second terminal of the fourth transistor, and the first terminal of the third transistor is coupled to the first terminal of the fourth transistor;
wherein the first output terminal of the first comparator is coupled to the control terminal of the first transistor, the second output terminal of the first comparator is coupled to the control terminal of the fourth transistor, the first output terminal of the second comparator is coupled to the control terminal of the third transistor, and the second output terminal of the second comparator is coupled to the control terminal of the second transistor;
wherein the first comparator is configured to compare a first voltage applied to the first input terminal of the first comparator and a second voltage applied to the second input terminal of the first comparator during a first operation cycle, and the second comparator is configured to compare a first voltage applied to the first input terminal of the second comparator and a second voltage applied to the second input terminal of the second comparator during a second operation cycle;
wherein when the second voltage is greater than the first voltage during the first operation cycle, the first comparator is configured to output a first voltage signal at the first output terminal of the first comparator and a second voltage signal at the second output terminal of the first comparator;
wherein when the second voltage is smaller than the first voltage during the first operation cycle, the first comparator is configured to output the second voltage signal at the first output terminal of the first comparator and the first voltage signal at the second output terminal of the first comparator;
wherein when the second voltage is greater than the first voltage during the second operation cycle, the second comparator is configured to output a first voltage signal at the first output terminal of the second comparator and a second voltage signal at the second output terminal of the second comparator;
wherein when the second voltage is smaller than the first voltage during the second operation cycle, the second comparator is configured to output the second voltage signal at the first output terminal of the second comparator and the first voltage signal at the second output terminal of the second comparator.

4. The power transfer device of claim 3,
wherein the first comparator comprises a first NOT gate having an input terminal and an output terminal and the second comparator comprises a second NOT gate having an input terminal and an output terminal;
wherein the input terminal of the first NOT gate is coupled to the first output terminal of the first comparator and the output terminal of the first NOT gate is coupled to the second output terminal of the first comparator;
wherein the input terminal of the second NOT gate is coupled to the first output terminal of the second comparator and the output terminal of the second NOT gate is coupled to the second output terminal of the second comparator.

5. The power transfer device of claim 3,
wherein the first transistor, the second transistor, the third transistor and the fourth transistor each comprise a third terminal;
wherein the rectifier further comprises a first dynamic body bias unit having a first terminal, a second terminal and a third terminal, and a second dynamic body bias unit having a first terminal, a second terminal and a third terminal;
wherein the first terminal of the first dynamic body bias unit is coupled to the first terminal of the first transistor, the first terminal of the second transistor, the second input terminal of the first comparator and the third input terminal of the second comparator;
wherein the second terminal of the first dynamic body bias unit is coupled to the second terminal of the first transistor, the first input terminal of the first comparator, the first input terminal of the second comparator, the second terminal of the third transistor and the second terminal of the second dynamic body bias unit;

wherein the third terminal of the first dynamic body bias unit is coupled to the third terminal of the first transistor;

wherein the first terminal of the second dynamic body bias unit is coupled to the first terminal of the third transistor, the first terminal of the fourth transistor, the third input terminal of the first comparator and the second input terminal of the second comparator;

wherein the third terminal of the second dynamic body bias unit is coupled to the third terminal of the third transistor;

wherein the third terminal of the second transistor is coupled to the second terminal of the second transistor and the third terminal of the fourth transistor is coupled to the second terminal of the fourth transistor.

6. The power transfer device of claim 5,
wherein the rectifier further comprises a first input terminal and a second input terminal;
wherein the first input terminal is coupled to the first terminal of the first dynamic body bias unit and the second input terminal is coupled to the first terminal of the second dynamic body bias unit.

7. The power transfer device of claim 6,
wherein the rectifier further comprises a capacitor having a first terminal and a second terminal, and a first output terminal and a second output terminal;
wherein the first terminal of the capacitor is coupled to the first output terminal and the second terminal of the second dynamic body bias unit;
wherein the second terminal of the capacitor is coupled to the second output terminal, the second terminal of the second transistor, the fourth input terminal of the first comparator, the fourth input terminal of the second comparator and the second terminal of the fourth transistor.

8. The power transfer device of claim 7, wherein the second terminal of the capacitor, the second output terminal, the second terminal of the second transistor, the fourth input terminal of the first comparator, the fourth input terminal of the second comparator and the second terminal of the fourth transistor are coupled to a reference voltage.

9. The power transfer device of claim 7, further comprising a regulator comprising:
a first transistor and a second transistor each having a first terminal, a second terminal and a control terminal, wherein the second terminal of the first transistor is coupled to the first terminal of the second transistor and a control terminal of the first transistor is coupled to a first voltage reference;
a feedback arrangement coupled between the control terminal of the first transistor and the second terminal of the second transistor;
wherein the feedback arrangement comprises:
a current comparator having an input terminal and an output terminal;
a third transistor and a fourth transistor each having a first terminal, a second terminal and a control terminal;
wherein the input terminal of the current comparator is coupled to the second terminal of the second transistor, and the output terminal of the current comparator is coupled to the control terminal of the third transistor and the control terminal of the fourth transistor;
wherein the first terminal of the third transistor is coupled to the first voltage reference and the second terminal of the third transistor is coupled to the second terminal of the fourth transistor and the control terminal of the first transistor;
wherein the first terminal of the fourth transistor is coupled to a second voltage reference.

10. The power transfer device of claim 9,
wherein the regulator further comprises a fifth transistor having a first terminal, a second terminal and a control terminal;
wherein the first terminal of the fifth transistor is coupled to the second voltage reference, the second terminal of the fifth transistor is coupled to the second terminal of the second transistor, and the control terminal of the fifth transistor is coupled to a third voltage reference.

11. The power transfer device of claim 9,
wherein the regulator further comprises:
an input terminal coupled to the first terminal of the first transistor and the first terminal of the third transistor;
an output terminal coupled between the second terminal of the first transistor and the first terminal of the second transistor.

12. The power transfer device of claim 9, wherein the rectifier is coupled between the circuit arrangement and the regulator.

13. The power transfer device of claim 11,
wherein the first input terminal of the rectifier is coupled to the first terminal of the inductor of the load transformation unit of the circuit arrangement, and the second input terminal of the rectifier is coupled to the second terminal of the inductor of the load transformation unit of the circuit arrangement;
wherein the first output terminal of the rectifier is coupled to the input terminal of the regulator.

14. The power transfer device of claim 1, wherein the power transfer device is a wireless power link device.

15. A rectifier, comprising:
a first transistor, a second transistor, a third transistor and a fourth transistor each having a first terminal, a second terminal and a control terminal;
a first comparator and a second comparator respectively having a first input terminal, a second input terminal, a third input terminal, a fourth input terminal, a first output terminal and a second output terminal;
wherein the first input terminal of the first comparator is coupled to the first input terminal of the second comparator, the second input terminal of the first comparator is coupled to the third input terminal of the second comparator, the third input terminal of the first comparator is coupled to the second input terminal of the second comparator, and the fourth input terminal of the first comparator is coupled to the fourth input terminal of the second comparator;
wherein the first terminal of the first transistor is coupled to the first terminal of the second transistor, the second terminal of the first transistor is coupled to the second terminal of the third transistor, the second terminal of the second transistor is coupled to the second terminal of the fourth transistor, and the first terminal of the third transistor is coupled to the first terminal of the fourth transistor;
wherein the first comparator is configured to compare a first voltage applied to the first input terminal of the first comparator and a second voltage applied to the second input terminal of the first comparator during a first operation cycle, and the second comparator is configured to compare a first voltage applied to the first input terminal of the second comparator and a second voltage applied to the second input terminal of the second comparator during a second operation cycle;
wherein when the second voltage is greater than the first voltage during the first operation cycle, the first comparator is configured to output a first voltage signal at the first output terminal of the first comparator and a second voltage signal at the second output terminal of the first comparator;

wherein when the second voltage is smaller than the first voltage during the first operation cycle, the first comparator is configured to output the second voltage signal at the first output terminal of the first comparator and the first voltage signal at the second output terminal of the first comparator;

wherein when the second voltage is greater than the first voltage during the second operation cycle, the second comparator is configured to output a first voltage signal at the first output terminal of the second comparator and a second voltage signal at the second output terminal of the second comparator;

wherein when the second voltage is smaller than the first voltage during the second operation cycle, the second comparator is configured to output the second voltage signal at the first output terminal of the second comparator and the first voltage signal at the second output terminal of the second comparator.

16. The rectifier of claim 15,
wherein the first transistor, the second transistor, the third transistor and the fourth transistor each comprises a third terminal;
wherein the rectifier further comprises a first dynamic body bias unit having a first terminal, a second terminal and a third terminal, and a second dynamic body bias unit having a first terminal, a second terminal and a third terminal;
wherein the first terminal of the first dynamic body bias unit is coupled to the first terminal of the first transistor, the first terminal of the second transistor, the second input terminal of the first comparator and the third input terminal of the second comparator;
wherein the second terminal of the first dynamic body bias unit is coupled to the second terminal of the first transistor, the first input terminal of the first comparator, the first input terminal of the second comparator, the second terminal of the third transistor and the second terminal of the second dynamic body bias unit;
wherein the third terminal of the first dynamic body bias unit is coupled to the third terminal of the first transistor;
wherein the first terminal of the second dynamic body bias unit is coupled to the first terminal of the third transistor, the first terminal of the fourth transistor, the third input terminal of the first comparator and the second input terminal of the second comparator;
wherein the third terminal of the second dynamic body bias unit is coupled to the third terminal of the third transistor;
wherein the third terminal of the second transistor is coupled to the second terminal of the second transistor and the third terminal of the fourth transistor is coupled to the second terminal of the fourth transistor.

17. The rectifier of claim 16, further comprising:
a first input terminal and a second input terminal;
wherein the first input terminal is coupled to the first terminal of the first dynamic body bias unit and the second input terminal is coupled to the first terminal of the second dynamic body bias unit.

18. The rectifier of claim 17, further comprising:
a capacitor having a first terminal and a second terminal, and a first output terminal and a second output terminal;
wherein the first terminal of the capacitor is coupled to the first output terminal and the second terminal of the second dynamic body bias unit;
wherein the second terminal of the capacitor is coupled to the second output terminal, the second terminal of the second transistor, the fourth input terminal of the first comparator, the fourth input terminal of the second comparator and the second terminal of the fourth transistor.

19. The rectifier of claim 18, wherein the second terminal of the capacitor, the second output terminal, the second terminal of the second transistor, the fourth input terminal of the first comparator, the fourth input terminal of the second comparator and the second terminal of the fourth transistor are coupled to a reference voltage.

20. A regulator, comprising:
a first transistor and a second transistor each having a first terminal, a second terminal and a control terminal, wherein the second terminal of the first transistor is coupled to the first terminal of the second transistor, a first terminal of the first transistor is coupled to a first voltage reference and a control terminal of the second transistor is coupled to a second voltage reference;
a feedback arrangement coupled between the control terminal of the first transistor and the second terminal of the second terminal;
wherein the feedback arrangement comprises:
a current comparator having an input terminal and an output terminal;
a third transistor and a fourth transistor each having a first terminal, a second terminal and a control terminal;
wherein the input terminal of the current comparator is coupled to the second terminal of the second transistor, and the output terminal of the current comparator is coupled to the control terminal of the third transistor and the control terminal of the fourth transistor;
wherein the first terminal of the third transistor is coupled to the first voltage reference and the second terminal of the third transistor is coupled to the second terminal of the fourth transistor and the control terminal of the first transistor;
wherein the first terminal of the fourth transistor is coupled to a third voltage reference.

21. The regulator of claim 20, further comprising:
a fifth transistor having a first terminal, a second terminal and a control terminal;
wherein the first terminal of the fifth transistor is coupled to the third voltage reference, the second terminal of the fifth transistor is coupled to the second terminal of the second transistor, and the control terminal of the fifth transistor is coupled to a third voltage reference.

* * * * *